United States Patent
Sasada et al.

(10) Patent No.: US 8,752,949 B2
(45) Date of Patent: Jun. 17, 2014

(54) INK COMPOSITION, INK SET AND INKJET RECORDING METHOD

(75) Inventors: Misato Sasada, Kanagawa (JP); Kiyoshi Irita, Kanagawa (JP); Yasufumi Ooishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 341 days.

(21) Appl. No.: 13/047,751

(22) Filed: Mar. 14, 2011

(65) Prior Publication Data

US 2011/0227991 A1 Sep. 22, 2011

(30) Foreign Application Priority Data

Mar. 18, 2010 (JP) .................................. 2010-063145

(51) Int. Cl.
*B41J 2/01* (2006.01)
*G01D 11/00* (2006.01)

(52) U.S. Cl.
USPC .......................................... 347/100; 347/101

(58) Field of Classification Search
CPC ...... B41J 2/2107; B41J 2/5052; C09D 11/101
USPC .................................................. 347/100–101
See application file for complete search history.

(56) References Cited

U.S. PATENT DOCUMENTS

| | | | | |
|---|---|---|---|---|
| 7,307,109 B2 * | 12/2007 | Yatake et al. | .................. | 523/160 |
| 2004/0027439 A1 * | 2/2004 | Cornelius et al. | ............. | 347/105 |
| 2006/0001719 A1 * | 1/2006 | Fukushige | .................... | 347/100 |
| 2006/0158499 A1 * | 7/2006 | Taguchi et al. | ................ | 347/100 |
| 2009/0079784 A1 * | 3/2009 | Chiwata et al. | ................. | 347/21 |
| 2009/0239996 A1 | 9/2009 | Saito | | |
| 2009/0246480 A1 | 10/2009 | Saito | | |
| 2009/0247669 A1 * | 10/2009 | Jung et al. | ..................... | 523/202 |
| 2010/0036036 A1 * | 2/2010 | Oyanagi | ....................... | 524/437 |

FOREIGN PATENT DOCUMENTS

| | | |
|---|---|---|
| JP | 3069543 B2 | 7/2000 |
| JP | 3576862 B2 | 10/2004 |
| JP | 3642152 B2 | 4/2005 |
| JP | 2008-137156 | 6/2008 |
| JP | 2009-227795 | 10/2009 |
| JP | 2009-256611 | 11/2009 |

OTHER PUBLICATIONS

Partial English language translation of the following: Office action dated Jul. 9, 2013 from the Japanese Patent Office in a Japanese patent application corresponding to the instant patent application. This office action translation is submitted now in order to supplement the understanding of patent document JP 2009-256611 and JP2009-227795 which are cited in the office action and are being disclosed in the instant Information Disclosure Statement.

(Continued)

*Primary Examiner* — Jason Uhlenhake
(74) *Attorney, Agent, or Firm* — SOLARIS Intellectual Property Group, PLLC

(57) ABSTRACT

An ink composition includes: a pigment; water; a polymerizable monomer that is capable of being polymerized by an active energy ray; and an initiator that is capable of initiating polymerization of the polymerizable monomer by the active energy ray, wherein a number of particles contained in the ink composition having a particle diameter of 0.8 μm or more is 20,000 particles/μl or less.

9 Claims, 1 Drawing Sheet

(56) References Cited

OTHER PUBLICATIONS

English language translation of the following: Office action dated Apr. 8, 2014 from the JPO in a Japanese patent application corresponding to the instant patent application. This office action translation is submitted now in order to supplement the understanding of patent document JP2008-137156 which is cited in the office action and is being disclosed in the instant information Disclosure Statement.

* cited by examiner

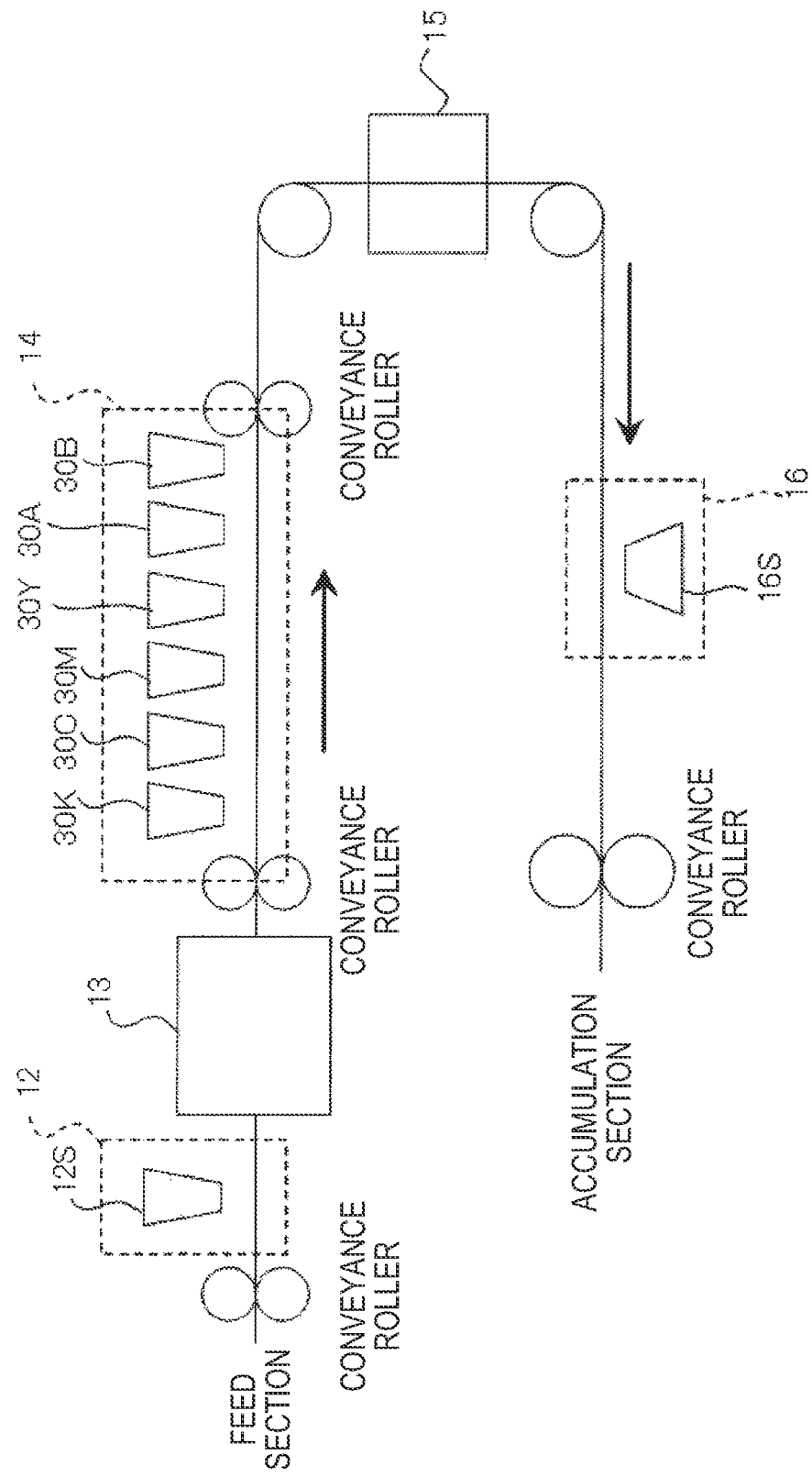

INK COMPOSITION, INK SET AND INKJET RECORDING METHOD

CROSS-REFERENCE TO RELATED APPLICATION

This Application claims priority under 35 USC 119 from Japanese Patent Application No. 2010-063145, filed on Mar. 18, 2010, the disclosure of which is incorporated by reference herein.

BACKGROUND OF THE INVENTION

1. Field of the Invention

The present invention relates to an ink composition, an ink set and an inkjet recording method.

2. Description of the Related Art

Inkjet technology provides an image recording method for recording a color image. Inkjet technology has been applied to the fields of, for example, office printers or home printers, and has recently been applied to commercial printing.

A pigment is widely used as a coloring agent, which is one of the components contained in an ink material for inkjetting. The pigment is used dispersed in a medium such as water. When the pigment is dispersed for use, the particle diameter of the dispersed pigment, stability after dispersion, size uniformity, jettability from a jetting head, and the like are important. Techniques that improve such properties have been widely studied.

There are cases in which pigment-containing inks do not have satisfactory properties in terms of fixability (for example, abrasion resistance), water resistance, stain resistance, or the like, since such inks generally remain on the surface of a recording medium rather than penetrating into the recording medium.

In order to impart favorable water resistance and stain resistance to pigment-containing inks, an ink composition for inkjetting that contains self-dispersing polymer particles has been disclosed (see, for example, Japanese Patent No. 3069543).

In this regard, in the method of including the self-dispersing polymer particles, a polymer or resin contained in the ink composition works as a binder. Although it is recognized that fixability, water resistance or the like is improved, sufficient performance cannot be obtained in some cases since the fixability depends on the thermal properties of the polymer. In particular, when inkjet recording is performed at high speed, sufficient thermal fixation cannot be obtained in some cases.

In order to address these problems, a technique of using an ink in which a polymerizable monomer and a pigment are used in combination and curing the ink by a UV ray (UV inkjet) is widely known and used. The UV inkjet exhibits superior abrasion resistance, but the ink is generally a solvent-based ink and, therefore, is not preferred from an environmental point of view. In addition, when the inks contact each other prior to curing, the inks coalesce (spotting interference) and are unsuitable for high speed recording.

For an aqueous pigment ink, which is environmentally favorable, studies have been conducted for improving abrasion resistance by including a polymerizable monomer in an aqueous pigment ink and curing the same. For example, an inkjet recording method has been disclosed in which printing is performed on a recording medium by depositing (i) a reaction liquid containing a photopolymerization initiator and a reagent that forms an aggregate when contacted with an ink composition and (ii) an ink composition containing an acrylate monomer or a resin emulsion (see, for example, Japanese Patent No. 3642152). In addition, a one-component ink used for inkjet recording has been disclosed which contains a specific cationic oligomer and a photopolymerization initiator, together with a colorant and water (see, for example, Japanese Patent No. 3576862).

SUMMARY OF THE INVENTION

However, in the methods disclosed in Japanese Patent Nos. 3642152 and 3576862, although abrasion resistance is increased, the method is still insufficient for practical application, and there is a need for further improvement of abrasion resistance in high speed recording.

According to a first aspect of the invention, there is provided an ink composition including: a pigment; water; a polymerizable monomer that is capable of being polymerized by an active energy ray; and an initiator that is capable of initiating polymerization of the polymerizable monomer by the active energy ray, wherein the number of particles contained in the ink composition having a particle diameter of 0.8 µm or more is 20,000 particles/µl or less.

According to a second aspect of the invention, there is provided an ink set including at least a cyan ink, a magenta ink, a yellow ink and a black ink, wherein each of the cyan ink, the magenta ink, the yellow ink and the black ink comprises the ink composition according to the first aspect of the invention.

According to a third aspect of the invention, there is provided an ink set including the ink composition according to the first aspect of the invention and a treatment liquid containing an aggregating agent that is capable of aggregating components of the ink composition.

According to a fourth aspect of the invention, there is provided an inkjet recording method including applying the ink composition according to the first aspect of the invention to a recording medium by inkjetting.

BRIEF DESCRIPTION OF THE DRAWINGS

FIG. 1 is a schematic diagram showing an example of the configuration of an inkjet recording device that is used to perform the image forming method of the present invention.

DETAILED DESCRIPTION OF THE INVENTION

The present invention has been made in view of the above circumstances, and an object of the present invention is to provide an ink composition capable of recording an image having superior abrasion resistance and image printing properties, at a higher speed than conventional cases.

Ink Composition

The ink composition according to the present invention includes at least a pigment, water, a polymerizable monomer that is capable of being polymerized by an active energy ray, and an initiator that is capable of initiating polymerization of the polymerizable monomer by the active energy ray, wherein the number of particles having a particle diameter of 0.8 µm or more contained in the ink composition is 20,000 particles/µl or less. The ink composition of the present invention is particularly preferably used for inkjet recording.

The ink composition of the present invention includes at least a pigment, water, an initiator, and a polymerizable monomer that is capable of being polymerized by an active energy ray. The scope of the ink composition may further include polymer particles and other additives such as dispersant, as necessary. Hereinafter, these components are described in detail.

Pigment

The ink composition in the present invention includes at least one pigment as a coloring material component. The pigment is not particularly limited, and may be selected appropriately according to the purpose. For example, the pigment may be an organic pigment or an inorganic pigment. The pigment is preferably almost completely insoluble in water or hardly soluble in water in consideration of ink coloring properties.

Examples of the organic pigment include an azo pigment, a polycyclic pigment, a dye chelate, a nitro pigment, a nitroso pigment, and aniline black. Among these, an azo pigment and a polycyclic pigment are preferable.

Examples of the inorganic pigment include titanium oxide, iron oxide, calcium carbonate, barium sulfate, aluminum hydroxide, barium yellow, cadmium red, chrome yellow, and carbon black. Among these, carbon black is particularly preferable.

Of the organic pigments, examples of organic pigments for orange or yellow include C. I. Pigment Orange 31, C. I. pigment orange 43, C. I. Pigment Yellow 12, C. I. Pigment Yellow 13, C. I. Pigment Yellow 14, C. I. Pigment Yellow 15, C. I. Pigment Yellow 17, C. I. Pigment Yellow 74, C. I. Pigment Yellow 93, C. I. Pigment Yellow 94, C. I. Pigment Yellow 128, C. I. Pigment Yellow 138, C. I. Pigment Yellow 151, C. I. Pigment Yellow 155, C. I. Pigment Yellow 180, and C. I. Pigment Yellow 185.

Examples of organic pigments for magenta or red include C. I. Pigment Red 2, C. I. Pigment Red 3, C. I. Pigment Red 5, C. I. Pigment Red 6, C. I. Pigment Red 7, C. I. Pigment Red 15, C. I. Pigment Red 16, C. I. Pigment Red 48:1, C. I. Pigment Red 53:1, C. I. Pigment Red 57:1, C. I. Pigment Red 122, C. I. Pigment Red 123, C. I. Pigment Red 139, C. I. Pigment Red 144, C. I. Pigment Red 149, C. I. Pigment Red 166, C. I. Pigment Red 177, C. I. Pigment Red 178, C.I. Pigment Red 222, and C. I. Pigment Violet 19.

Examples of organic pigments for green or cyan include C. I. Pigment Blue 15, C. I. Pigment Blue 15:2, C. I. Pigment Blue 15:3, C. I. Pigment Blue 15:4, C. I. Pigment Blue 16, C. I. Pigment Blue 60, C. I. Pigment Green 7, and siloxane cross-linked aluminum phthalocyanine disclosed in the specification of U.S. Pat. No. 4,311,775.

Examples of organic pigments for black include C. I. Pigment Black 1, C. I. Pigment Black 6 and C. I. Pigment Black 7.

The volume average particle diameter of the pigment (when a pigment is coated with the following dispersant, a particle of the coated pigment) is preferably from 30 nm to 150 nm, more preferably 30 nm to 120 nm, and even preferably from 30 to 100 nm. When the average particle diameter is 150 nm or less, color reproducibility is excellent and jettability when jetted by an inkjet method is good. When the average particle diameter is 30 nm or more, light fastness is good. The particle diameter distribution of a colorant (pigment) is not particularly limited and may be a broad particle diameter distribution or a mono-dispersed particle diameter distribution. Two or more of the colorants having a mono-dispersed particle diameter distribution may be mixed and used. The average particle diameter and the particle diameter distribution of the pigment may be obtained by measuring by a dynamic light scattering method using a NANOTRAC particle size distribution measuring instrument UPA-EX150 (trade name, manufactured by NIKKISO CO., LTD.).

The pigment may be used singly or two or more of the pigments may be used in combination.

The content of the pigment in the ink composition is preferably from 1% by mass to 25% by mass, more preferably from 1.8% by mass to 10% by mass, and particularly preferably from 1.8% by mass to 5.5% by mass, with respect to the ink composition, from the viewpoint of image density.

Dispersant

The ink composition of the present invention may contain at least one dispersant. The dispersant for the pigment may be a polymer dispersant or a low-molecular-weight surfactant-type dispersant. The polymer dispersant may be a water-soluble dispersant or a water-insoluble dispersant.

The low-molecular-weight surfactant-type dispersant can maintain a low viscosity level of an ink and stably disperse a pigment in an aqueous solvent. The low-molecular-weight surfactant-type dispersant refers to a low-molecular-weight dispersant having a molecular weight of 2,000 or less. The molecular weight of the low-molecular-weight surfactant-type dispersant is preferably from 100 to 2,000, and more preferably from 200 to 2,000.

The low-molecular-weight surfactant-type dispersant has a structure including a hydrophilic group and a hydrophobic group. Each of at least one hydrophilic group and at least one hydrophobic group may be contained in one molecule independently. The low-molecular-weight surfactant-type dispersant may include plural kinds of hydrophilic groups and hydrophobic groups, respectively, and may optionally contain a linking group for connecting a hydrophilic group and a hydrophobic group.

The hydrophilic group may be an anionic group, a cationic group, a nonionic group, and a betaine-type which is a combination thereof.

The anionic group is not particularly restricted as long as the anionic group has a negative charge. However, the anionic group is preferably a phosphoric acid group, a phosphonic acid group, a phosphinic acid group, a sulfuric acid group, a sulfonic acid group, a sulfinic acid group, or a carboxylic acid group, more preferably a phosphoric acid group or a carboxylic acid group, and still more preferably a carboxylic acid group.

The cationic group is not particularly restricted as long as the cationic group has a positive charge. However, the cationic group is preferably an organic cationic substituent, is more preferably a cationic group containing a nitrogen atom or phosphorous atom, and still more preferably a pyridinium cation or an ammonium cation.

Examples of the nonionic group include polyethylene oxide, polyglycerin, and a sugar unit of a certain kind.

The hydrophilic group is preferably an anionic group. The anionic group is preferably a phosphoric acid group, a phosphonic acid group, a phosphinic acid group, a sulfuric acid group, a sulfonic acid group, a sulfinic acid group, or a carboxylic acid group, more preferably a phosphoric acid group or a carboxylic acid group, and still more preferably a carboxylic acid group.

When the low-molecular-weight surfactant-type dispersant has an anionic hydrophilic group, from the viewpoints of accelerating an aggregation reaction bringing the low-molecular-weight surfactant-type dispersant into contact with an acidic treatment liquid, the pKa thereof is preferably 3 or more. The pKa of a low-molecular-weight surfactant-type dispersant refers to a value experimentally obtained from a titration curve obtained in such a manner that a liquid in which a low-molecular-weight surfactant-type dispersant is dissolved in a solution of tetrahydrofuran and water (3:2=V/V) at a concentration of 1 mmol/L is titrated with an acidic or alkaline solution. When the pKa of a low-molecular-weight surfactant-type dispersant is 3 or more, theoretically, 50% or more of anionic groups is in an undissociated state when the low-molecular-weight surfactant-type dispersant is brought into contact with a liquid with a pH of about 3. Therefore, the water solubility of the low-molecular-weight surfactant-type dispersant remarkably decreases and aggregation reaction takes place. That is, aggregation reactivity is improved. From this point of view, it is preferable that the low-molecular-weight surfactant-type dispersant has a carboxylic acid groups as an anionic group.

The hydrophobic group may have any structures containing a hydrocarbon, a fluorocarbon, a silicone, or the like, it is particularly preferable that the hydrophobic group has a structure containing a hydrocarbon. The hydrophobic group may either have a straight-chained structure or a branched structure. The hydrophobic group may have a structure with a single chain or a structure with two or more chains, and when the hydrophobic group has a structure with two or more chains, the hydrophobic group may contain plural kinds of hydrophobic groups.

The hydrophobic group has preferably a hydrocarbon group having from 2 to 24 carbon atoms, more preferably a hydrocarbon group having from 4 to 24 carbon atoms, and still more preferably a hydrocarbon group having from 6 to 20 carbon atoms.

Among the polymer dispersant, as the water-soluble dispersant, a hydrophilic polymer compound may be used. Examples of the natural hydrophilic polymer compound include plant-derived polymers such as gum arabic, gum tragan, guar gum, karaya gum, locust bean gum, arabinogalacton, pectin, or queens seed starch; sea weed-derived polymers such as alginic acid, carrageenan, or agar; animal-derived polymers such as gelatin, casein, albumen, or collagen; and microorganism-derived polymers such as xanthan gum or dextran.

Examples of the hydrophilic polymer compound formed by chemically modifying a natural product as a raw material include cellulose polymers such as methyl cellulose, ethyl cellulose, hydroxyethyl cellulose, hydroxypropyl cellulose, or carboxymethyl cellulose; starch polymers such as sodium starch glycolate or sodium starch phosphate ester; and sea weed polymers such as sodium alginate or propylene glycol ester alginate.

Examples of synthetic hydrophilic polymer compounds include vinyl polymers such as polyvinyl alcohol, polyvinyl pyrrolidone, or polyvinyl methyl ether; acrylic resins such as non-crosslinked polyacrylamide, polyacrylic acid or an alkali metal salt thereof or water-soluble styrene acrylic resin; water-soluble styrene maleic acid resins; water-soluble vinyl naphthalene acrylic resins; water-soluble vinyl naphthalene maleic acid resins; polyvinylpyrrolidone; polyvinylalcohol; an alkali metal salt of β-naphthalenesulfonic acid-formalin condensate; polymer compounds having a salt of cationic functional group such as a quaternary ammonium or an amino group at the side chain; and natural polymer compounds such as shellac.

Among these, the hydrophilic polymer compound is preferably a water-soluble dispersant in which a carboxyl group is introduced therein. Examples thereof include a homopolymer of such as an acrylic acid, a methacrylic acid, or a styrene-acrylic acid; and a copolymer of monomers including other hydrophilic groups.

Among these polymer dispersants, as the water-insoluble dispersant, a polymer having both a hydrophobic moiety and a hydrophilic moiety may be used. Examples thereof include a styrene-(meth)acrylic acid copolymer, a styrene-(meth) acrylic acid-(meth)acrylic acid ester copolymer, a (meth) acrylic acid ester-(meth)acrylic acid copolymer, a polyethylene glycol (meth)acrylate-(meth)acrylic acid copolymer, a vinyl acetate-maleic acid copolymer, and styrene-maleic acid copolymer.

The weight-average molecular weight of the polymer dispersant is preferably from 3,000 to 100,000, more preferably from 5,000 to 50,000, still more preferably from 5,000 to 40,000, and particularly preferably from 10,000 to 40,000.

The acid value of the polymer dispersant is preferably 100 mgKOH/g or less from the viewpoints of good aggregation properties when contacting with the treatment liquid. Further, the acid value is more preferably from 25 mgKOH/g to 100 mgKOH/g, and particularly preferably from 30 mgKOH/g to 90 mgKOH/g. When the acid value of the polymer dispersant is 25 mgKOH/g or more, the stability of the self-dispersibility is good.

The polymer dispersant preferably includes a polymer having a carboxyl group, more preferably includes a polymer having a carboxyl group and an acid value of from 25 mgKOH/g to 100 mgKOH/g, from the viewpoints of the self-dispersibility and the aggregation speed at the time when coming in contact with the treatment liquid.

The mass mixing ratio (p:s) of a pigment (p) and a dispersant (s) is preferably in a range of from 1:0.06 to 1:3, more preferably in a range of from 1:0.125 to 1:2, and still more preferably from 1:0.125 to 1:0.7.

In the present invention, from the viewpoints of light fastness and quality of an image, the ink composition preferably contains a pigment and a dispersant, more preferably contains an organic pigment and a polymer dispersant, and particularly preferably contains an organic pigment and a polymer dispersant having a carboxyl group. The pigment is preferably a water-insoluble pigment coated with a polymer dispersant having a carboxyl group, from the viewpoint of aggregation properties. Further, from the viewpoint of aggregation properties, the acid value of a self-dispersing polymer particle described below is preferably lower than that of the polymer dispersant.

Polymerizable Monomer

The ink composition of the present invention contains at least one polymerizable monomer that is capable of being polymerized by the active energy ray (for example, radiation, light or an electron beam). The polymerizable monomer is used in combination with the pigment, and for example, when the ink composition contacts a treatment liquid or the like (described below) and is aggregated, the polymerizable monomer is incorporated into a space between particles, whereby an image is strengthened by the following polymerization and curing, and negative effects on the jettability of the ink composition caused by the use of conventional polymerizable polymer compounds can be eliminated.

The polymerizable monomer of the present invention is preferably water-soluble. The term "water-soluble" refers to a property to be dissolved in water at a concentration that is equal to or more than a certain level. Any polymerizable monomer is used so long as it is soluble (preferably uniformly) in an aqueous ink. In addition, a polymerizable monomer which is (preferably uniformly) soluble in an ink by adding the following water-soluble organic solvent to increase solubility may be used. Specifically, solubility of the ink composition in water (25° C.) is preferably 10% by mass or more, and more preferably 15% by mass or more.

As the polymerizable monomer, a nonionic polymerizable monomer is preferable, and a polymerizable monomer having a solubility in water of 10% by mass or more (further preferably, 15% by mass or more) is preferable, from the viewpoint of reactivity with an aggregating agent and a pigment.

Examples of the nonionic polymerizable monomer include polymerizable monomers such as acrylic monomers.

Examples of acrylic monomers include N,N-dimethylaminoethyl methacrylate, N,N-dimethylaminoethyl acrylate, N,N-dimethylaminopropyl methacrylate, N,N-dimethylaminopropyl acrylate, N,N-dimethylamino acrylamide, N,N-dimethylamino methacrylamide, N,N-dimethyl amino ethylacrylamide, N,N-dimethylaminoethyl methacrylamide, N,N-dimethylaminopropylacrylamide, N,N-dimethylaminopropylmethacrylamide, and quaternary compounds thereof. In addition, examples of acrylic monomers include a (meth) acrylic acid ester of polyhydric alcohol, a (meth)acrylic acid ester of a glycidyl ether of a polyhydric alcohol, a (meth) acrylic acid ester of a polyethylene glycol, a (meth)acrylic acid ester of an ethylene oxide adduct of a polyhydric alcohol, and UV curable monomers and oligomers such as a reaction product between a polybasic acid anhydride and a hydroxyl group-containing (meth)acrylic acid ester.

The polyhydric alcohol may have a chain therein that is elongated by an ethylene oxide chain formed by addition of an ethylene oxide.

Specific examples (nonionic compounds 1 to 4) of the nonionic polymerizable monomer are shown below, but the present invention is not limited thereto.

Nonionic compound 1

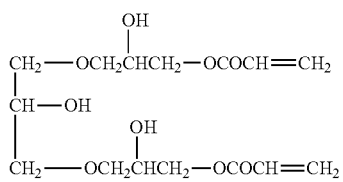

Nonionic compound 2

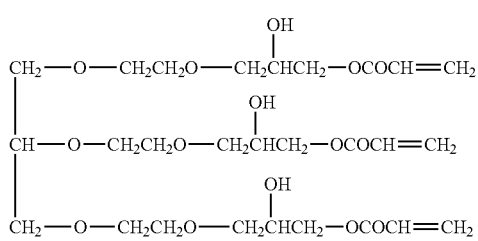

Nonionic compound 3

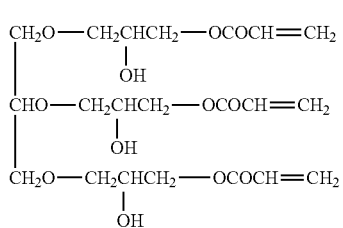

Nonionic compound 4

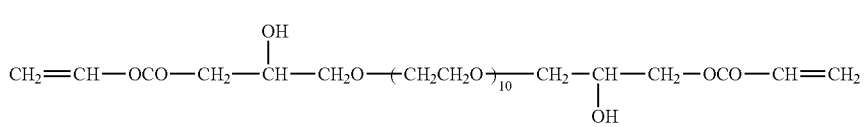

An acrylic acid ester having two or more acryloyl groups in a molecule thereof that is derived from a compound having multiple hydroxyl groups may also be used. Examples of the compound having multiple hydroxyl groups include a condensate of a glycol, an oligoether, and an oligoester.

The nonionic polymerizable monomer is also preferably an acrylic acid ester or a (meth)acrylic acid ester of a polyol having two or more hydroxyl groups such as a monosaccharide or a disaccharide; and a (meth)acrylic acid ester of triethanolamine, diethanolamine, trishydroxyaminomethane, or trishydroxyaminoethane. Specific examples (nonionic compounds (a)-(k) and (1)-(5)) of these nonionic polymerizable monomers are shown below, but the present invention is not limited thereto.

(a)

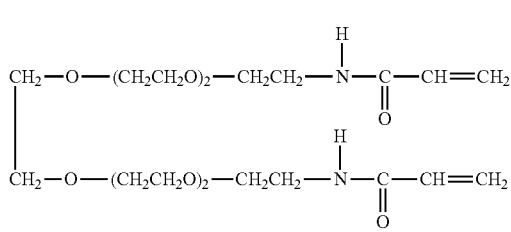

(b)

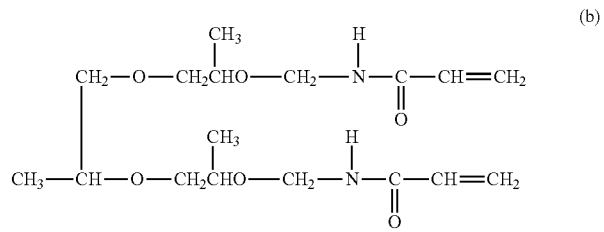

-continued
(c)
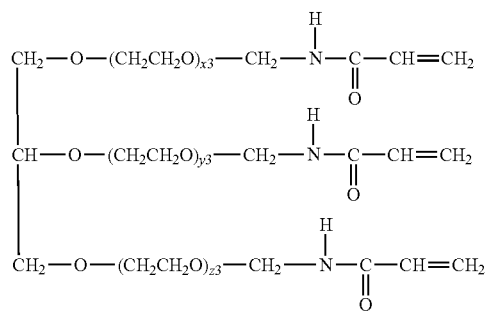
$x_3 + y_3 + z_3 = 6$
(d)
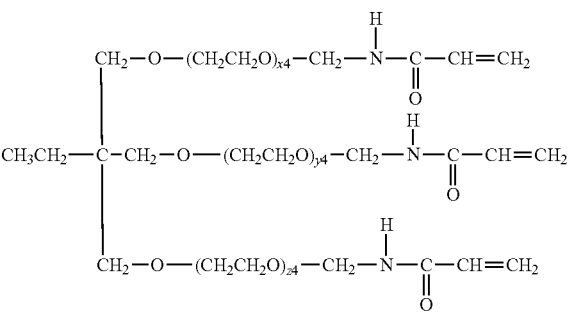
$x_4 + y_4 + z_4 = 9$
(e)
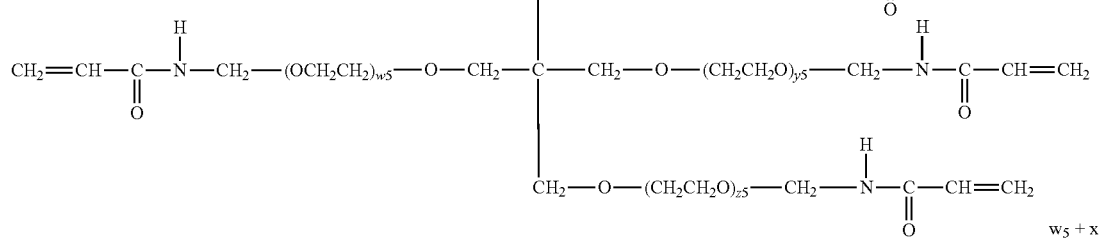
$w_5 + x_5 + y_5 + z_5 = 6$
(f)
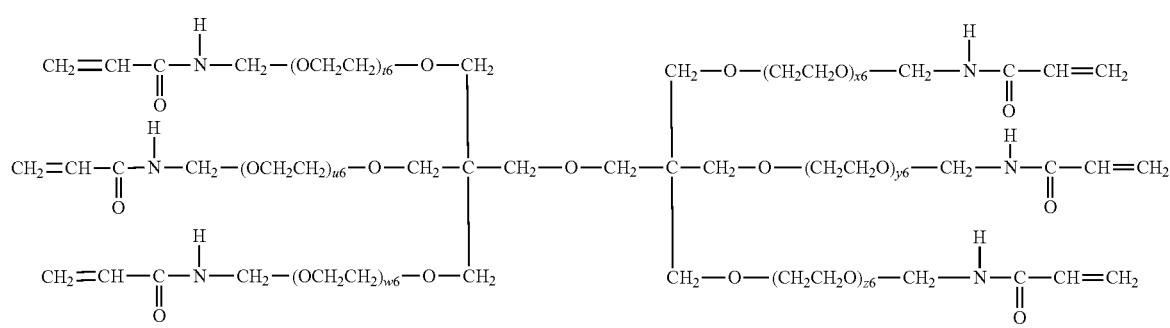
$t_6 + u_6 + w_6 + x_6 + y_6 + z_6 = 12$
(g)
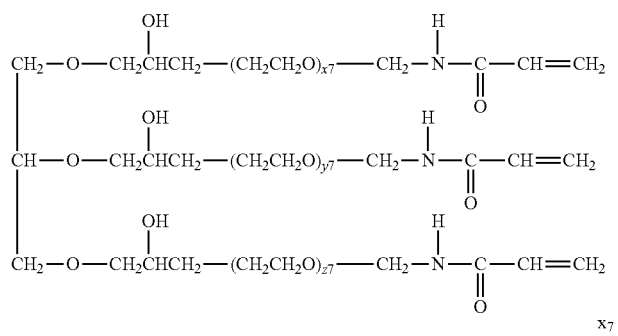
$x_7 + y_7 + z_7 = 3$

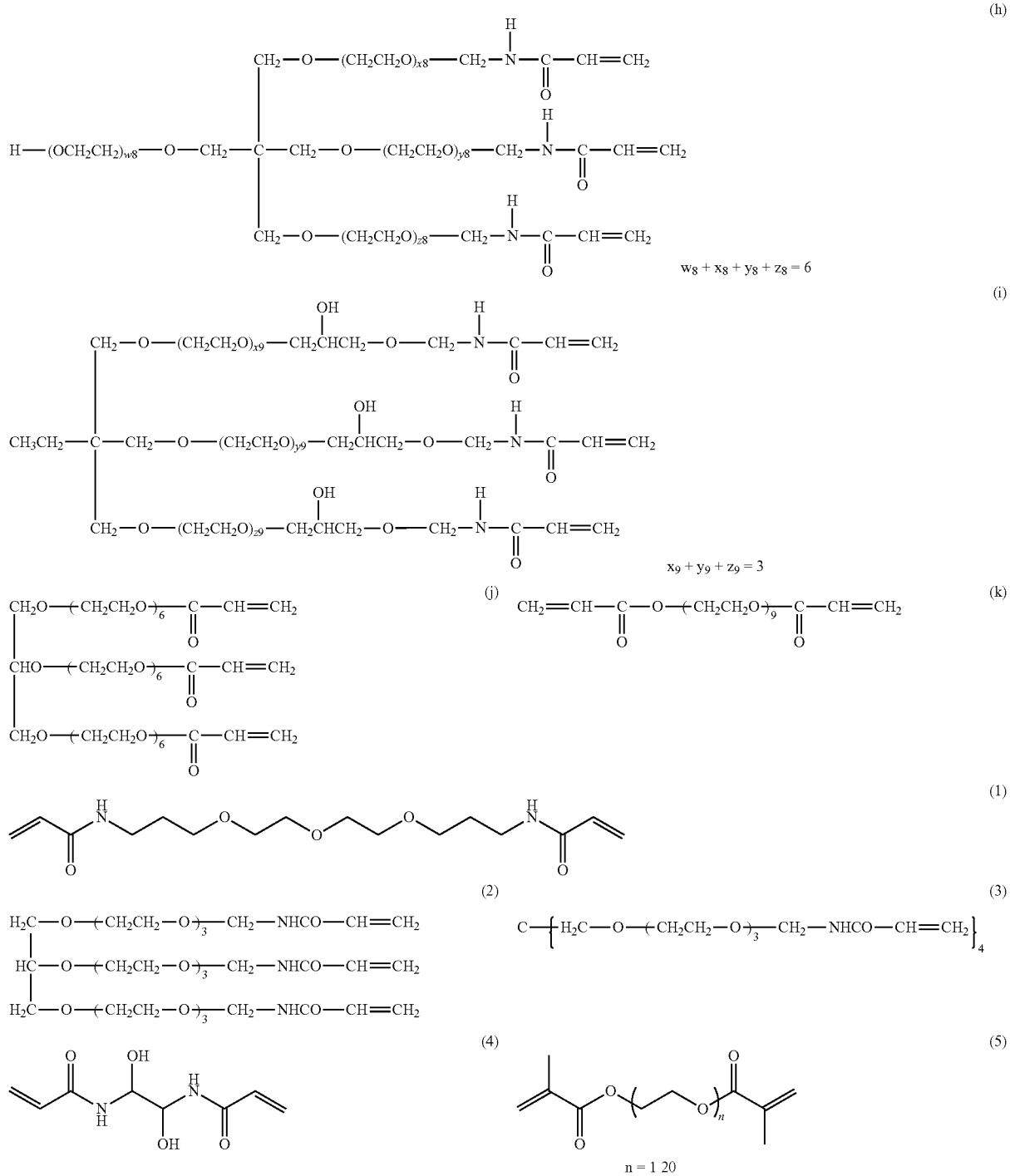

The polymerizable monomer in the present invention is preferably a multifunctional monomer, and more preferably a bifunctional monomer to a hexafunctional monomer, from the viewpoints of increasing abrasion resistance. From the viewpoints of achieving both satisfactory solubility and satisfactory abrasion resistance, the polymerizable monomer is preferably a bifunctional to tetrafunctional monomer.

In the ink composition of the present invention, one kind of the polymerizable monomer may be contained or two or more kinds of the polymerizable monomers may be contained in combination. The content of the polymerizable monomer in the ink composition that is capable of polymerized by an active energy ray is preferably from about 4% by mass to about 30% by mass, and more preferably from about 10% by mass to about 22% by mass, with respect to the in the ink composition, from the viewpoint of abrasion resistance.

Initiator

The ink composition of the present invention contains at least one initiator that is capable of initiating polymerization of the polymerizable monomer by an active energy ray. By using the polymerizable monomer together with the initiator in a one-component liquid, the distribution of the monomer and the initiator after recording is uniform, curability is improved and abrasion resistance can be further improved.

The initiator may be selected from known polymerization initiators without particular limitation and is particularly preferably a photopolymerization initiator.

Examples of preferred photopolymerization initiators that may be used in the present invention include (a) aromatic ketones, (b) acyl phosphine compounds, (c) aromatic onium salt compounds, (d) organic oxides, (e) thio compounds, (f) hexaarylbiimidazole compounds, (g) keto oxime ester compounds, (h) borate compounds, (i) azinium compounds, (j) metallocene compounds, (k) active ester compounds, (l) compounds having a carbon-halogen bond, and (m) alkylamine compounds.

Specific examples of a polymerization initiator include polymerization initiators disclosed in Kiyomi Kato, "UV curing system" (issued by Kabushikikaisha Sogo Gijutsu Center (Technology Center Inc), 1989, P 65-148).

The polymerization initiator of the present invention may be a water-insoluble initiator dispersed in water or may be a water-soluble initiator, but is preferably a water-soluble polymerization initiator. The term "water-soluble" for the polymerization initiator means that 0.5% by mass or more of a polymerization initiator dissolves in distilled water at 25° C. The water-soluble polymerization initiator preferably dissolves in an amount of 1% by mass or more, and more preferably in an amount of 3% by mass or more, in distilled water at 25° C.

In addition, the content of the polymerization initiator in the ink composition of the present invention is preferably from 0.01 parts by mass to 35 parts by mass, more preferably from 0.1 parts by mass to 30 parts by mass, and even more preferably from 0.5 parts by mass to 30 parts by mass, with respect to 100 parts by mass of the polymerizable monomer. Here, the content of polymerization initiator means the total content of the polymerization initiator present in the ink composition, and the content of polymerizable monomer means the total content of the polymerizable monomer present in the ink composition.

One kind of the initiator may be used singly, or two or more kinds of the initiators may be mixed and used. The polymerization initiator may be used in combination with a sensitizer.

Examples of the sensitizer include an amine-containing compound (for example, aliphatic amines, amines including an aromatic group, and piperidine), a urea (for example, allyl-containing urea and o-tolythiourea), a sulfur-containing compound (for example, sodium diethyl dithiophosphate and a soluble salt of an aromatic sulfinic acid), a nitrile-containing compound (for example, N,N,-disubstituted p-amino benzonitrile), a phosphorous-containing compound (for example, tri-n-butyl phosphine, sodium diethyl dithio phosphate), a nitrogen-containing compound (for example, Michler's ketone, a N-nitrosohydroxylamine derivative, an oxazolidine compound, a tetrahydro 1, 3 oxyazine compound, a condensate of a diamine with formaldehyde or acetoaldehyde), a chlorine-containing compound (for example, a carbon tetrachloride and hexachloroethane), a polymerized amine that is a reaction product of an epoxy resin and an amine, and triethanolamine triacrylate.

The sensitizer may be contained as long as the effects of the present invention are not impaired.

Particles Having Particle Diameter of 0.8 μm or More

In the ink composition of the present invention, the number of particles having a particle diameter of 0.8 μm or more (hereinafter, referred to as a "coarse particle") is about 20,000 particles/μl or less, preferably about 10,000 particles/μl or less, and more preferably about 4,000 particles/μl or less. In the present invention, abrasion resistance is improved by adjusting the number of coarse particles to be within the range defined above. In particular, in the present invention, both abrasion resistance and image forming properties of a secondary (or higher) color image are improved. This mechanism is not clear, but we currently assume as follows. When an image is recorded on a recording medium using a conventional ink composition, a number of coarse particles appear on some regions of a surface of a recording layer (image) formed by the ink composition. The surface regions having the coarse particles are hard to coat with a binder, and has only insufficient adhesiveness to the binder. In the surface regions having the coarse particles, the recording layer has an increased surface roughness and an increased frictional resistance. In addition, it is difficult to perform uniform polymerization around the coarse particles in some cases. As a result, the recording layer is vulnerable to friction. In addition, the coarse particles tend to cause deteriorated jettability and deteriorated image forming properties. Meanwhile, it is thought that since the ink composition of the present invention contains a polymerizable monomer and the like, and has a specific amount of coarse particles having a specific size, the above described phenomenon is suppressed and abrasion resistance and image forming properties are improved. It is thought that when a secondary (or higher) color image is recorded (manufacturing of second or subsequent recording layers), abrasion resistance is improved, and since superposition of the recording layers (recording) is performed while suppressing detachment of pigment particles, image forming properties are further improved.

Any coarse particle may be used without particular limitation as the coarse particle of the present invention so long as the coarse particle is contained in the ink composition and has a particle diameter of 0.8 μm or more. Generally, the coarse particle is a particle formed by adhesion of a polymerizable monomer, an aggregate in which pigments are aggregated each other, and optionally contained other additives (for example, an initiator, a dispersant, or a polymer particle (described below), other additives (described below)) to a surface of a pigment. However, a particle that is formed by additives (for example, among polymer particles, or polymer particles and a dispersant) aggregated to have a large size may also be used.

The upper limit of the particle diameter of the coarse particles is not limited, and is for example about 5 μm or less. The lower limit of the number of the coarse particles is not limited, and is for example about 250 particles/μl. The particle diameter and the number of coarse particles are measured from the number of coarse particles having a size of from 0.8 μm to 5 μm in the ink composition using a flow-type particle shape analyzer FPIA3000 (trade name, manufactured by Sysmex Corporation).

The adjustment of the number of the coarse particles in the ink composition may be carried out by a known method. For example, the number of coarse particles is adjusted to 20,000 particles/μm or less by subjecting the ink composition of the present invention containing a pigment, a polymerizable monomer, an initiator and water, and optionally containing other additives to a single known method such as centrifugal separation, filtration using a filter, or the like or a combination thereof.

For example, the centrifugal separation is commonly carried out at from about 500 G to about 30,000 G (preferably from about 500 G to about 25,000 G, and particularly preferably from about 1,000 G to about 15,000 G) for from about 5 minutes to about 3 hours (preferably from about 10 minutes to about 2 hours). Examples of centrifuges include high-speed refrigerated centrifuges and large-capacity refrigerated centrifuges (both are manufactured by Kubota Corporation), and refrigerated high-speed centrifuges, refrigerated large-capacity centrifuges and continuous high-speed centrifuges (all are manufactured by Kokusan Co., Ltd.).

A method for the filtration using a filter is not particularly limited, and a filter with a pore diameter of from 0.2 µm to 5 µm may be used as necessary. Examples of filters include hydrophilic PTFE membrane filters (such as H100A-, H050A-, H020A- or H010A-(trade names), manufactured by Advantec Toyo Roshi Kaisha, Ltd.), glass filter papers (such as GS-25, GC-90 or DP-70 (trade names), manufactured by Advantec Toyo Roshi Kaisha, Ltd.), and Omnipore membrane filters (JGWP, JHWP, JAWP, JMWP (trade names), manufactured by Millipore Corporation). The filer may be used alone or in a combination of two or more thereof.

Polymer Particle

The ink composition of the present invention may contain at least one polymer particle. The polymer particle has a function to fix the ink composition by destabilizing and aggregating dispersion, thereby thickening the ink, when the polymer particle contacts a treatment liquid described below or a region on which the treatment liquid has been applied and dried, and further improves fixability of the ink composition onto a recording medium and abrasion resistance of an image.

For a reaction with an aggregating agent, a polymer particle having an anionic surface electric charge is used, and widely and generally known latex is used within the range capable of obtaining sufficient reactivity and jetting stability. However, it is particularly preferably that a self-dispersing polymer particle is used.

Hereinafter, the self-dispersing polymer particle as a preferred polymer particle is described in detail.

Self-Dispersing Polymer Particle

The ink composition of the present invention preferably contains at least one self-dispersing polymer particle as a polymer particle. The self-dispersing polymer particle has a function to fix the ink composition by destabilizing and aggregating dispersion, thereby thickening the ink, when the self-dispersing polymer particles contacts the treatment liquid described below or a region on which the treatment liquid has been applied and dried, and further improves fixability of the ink composition onto a recording medium and abrasion resistance of an image. The self-dispersing polymer particle is a preferable resin particle from the viewpoints of jetting stability and the liquid stability of a system including the pigment (particularly, dispersion stability).

The term "self-dispersing polymer particle" means a water-insoluble polymer particle that does not contain free emulsifier and that can get into a dispersed state in an aqueous medium even in the absence of a surfactant due to a functional groups (particularly, an acidic group or a salt thereof) which the polymer itself has.

The term "dispersed state" used herein includes both an emulsified state (emulsion) in which a water-insoluble polymer in a liquid state is dispersed in an aqueous medium and a dispersed state (suspension) in which a water-insoluble polymer in a solid state is dispersed in an aqueous medium.

The water-insoluble polymer of the present invention is preferably a water-insoluble polymer that can get into a dispersed state in which the water-insoluble polymer is dispersed in a solid state from the viewpoints of aggregation speed and fixability when the water-insoluble polymer is contained in a liquid composition.

The following procedure can be used to determine whether a water-insoluble polymer is a self-dispersing polymer as mentioned herein: 30 g of a water-insoluble polymer is dissolved in 70 g of an organic solvent (such as methyl ethyl ketone) to form a solution, the solution is mixed with 200 g of water and a neutralizing agent that can neutralize a salt-forming group of the water-insoluble polymer to a degree of 100% (the neutralizing agent being sodium hydroxide if the salt-forming group is anionic, or acetic acid if the salt-forming group is cationic), the mixture is stirred with a stirrer having a stirring blade (a rotation rate: 200 rpm, 25° C., for 30 minutes), and the organic solvent is removed from the mixture liquid. If a stable dispersion state of the water-insoluble polymer in the mixture liquid is confirmed by visual observation for at least one week at 25° C. after the removal of the organic solvent, the water-insoluble polymer is considered to be a self-dispersing polymer.

The term "water-insoluble polymer" refers to a polymer having an amount of dissolution of 10 g or less in 100 g of water at 25° C. when the polymer is dissolved in 100 g of water at 25° C. after being dried at 105° C. for 2 hours. The amount of dissolution is preferably 5 g or less, and more preferably 1 g or less. The amount of dissolution is an amount of dissolution when a polymer is neutralized to a degree of 100% by either sodium hydroxide or acetic acid, depending on a kind of the salt-forming group of the water-insoluble polymer.

The aqueous medium contains water and may optionally contain a hydrophilic organic solvent. In the present invention, the aqueous medium is preferably formed from water and 0.2% by mass or less of a hydrophilic organic solvent with respect to the mass of water, and more preferably formed from water.

The main chain skeleton of the water-insoluble polymer is not particularly limited, and examples of the main chain skeleton include vinyl polymers, condensed polymers (such as epoxy resins, polyester, polyurethane, polyamide, cellulose, polyether, polyurea, polyimide or polycarbonate). Of these, a vinyl polymer is particularly preferable.

Examples of preferred vinyl polymers and monomers for forming the vinyl polymer include those disclosed in Japanese Patent Application Laid-Open (JP-A) Nos. 2001-181549 and 2002-88294. It is also possible to use a vinyl polymer that has a dissociable group introduced to a terminal of the polymer chain by the radical polymerization of a vinyl monomer using a chain transfer agent a polymerization initiator or an iniferter that has a dissociable group (or a substituent that can be converted to the dissociable group) or ion polymerization using a compound having the dissociable group (or a substituent converted to the dissociable group) as either an initiator or a terminator.

Examples of a preferred condensed polymer and a monomer forming the condensed polymer include those disclosed in JP-A No. 2001-247787.

From the viewpoint of self-dispersibility, the self-dispersing polymer particle preferably contains a water-insoluble polymer having a hydrophilic structural unit and a structural unit derived from an aromatic group-containing monomer.

The hydrophilic forming unit is not particularly limited as long as the hydrophilic forming unit is derived from a hydrophilic group-containing monomer, and may be derived from a monomer containing one kind of hydrophilic group or a monomer containing two or more kinds of hydrophilic groups The hydrophilic group is not particularly limited and may be a dissociable group or a nonionic hydrophilic group.

From the viewpoints of accelerating self-dispersion and stability of a formed emulsion or dispersion, the hydrophilic group of the present invention is preferably a dissociable group, and more preferably an anionic dissociable group. Examples of preferred dissociable groups include a carboxyl group, a phosphoric acid group and a sulfonic acid group. Of these, a carboxyl group is preferred, from the viewpoint of fixability when an ink composition is formed.

From the viewpoints of self-dispersibility and aggregation properties, the hydrophilic group-containing monomer of the present invention is preferably a dissociable group-containing monomer, and more preferably a dissociable group-containing monomer having a dissociable group and an ethylenic unsaturated bond.

Examples of the dissociable group-containing monomer include an unsaturated carboxylic acid monomer, an unsaturated sulfonic acid monomer and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxy methyl succinic acid.

Specific examples of the unsaturated sulfonic acid monomer include styrene sulfonic acid, 2-acrylamide-2-methylpropane sulfonic acid, 3-sulfopropyl(meth)acrylate, and bis-(3-sulfopropyl)-itaconic acid ester.

Specific examples of the unsaturated phosphoric acid monomer include vinyl phosphonic acid, vinyl phosphate, bis(methacryloyloxyethyl) phosphate, diphenyl-2-acryloyloxyethyl phosphate, diphenyl-2-methacryloyloxyethyl phosphate, and dibutyl-2-acryloyloxyethyl phosphate.

Among the dissociable group-containing monomers, the unsaturated carboxylic acid monomers are preferred, acrylic monomers and methacrylic monomers are more preferred, and acrylic acid and methacrylic acid are particularly preferred, from the viewpoints of dispersion stability and jetting stability.

An acid value of the self-dispersing polymer particle in the invention is preferably 50 mg KOH/g or less from the viewpoints of good aggregation properties when contacting the treatment liquid. Furthermore, the acid value is more preferably from 25 mg KOH/g to 50 mg KOH/g, and particularly preferably from 30 mgKOH/g to 50 mg KOH/g. When the acid value of the self-dispersing polymer particle is 25 mg KOH/g or more, the stability of self-dispersibility stability is further improved.

From the viewpoints of self-dispersibility and an aggregation speed when contacting the treatment liquid, the self-dispersing polymer particle in the invention preferably contains a polymer having a carboxyl group, and more preferably contains a polymer having a carboxyl group and an acid value of from 25 mg KOH/g to 50 mg KOH/g, and more preferably contains a polymer having a carboxyl group and an acid value of from 30 mg KOH/g to 50 mg KOH/g.

The aromatic group-containing monomer is not particularly limited as long as the aromatic group-containing monomer is a compound having an aromatic group and a polymerizable group. The aromatic group may be derived from an aromatic hydrocarbon or an aromatic heterocycle. In the present invention, an aromatic group derived from an aromatic hydrocarbon is preferable, from the viewpoints of particle shape stability in an aqueous medium.

The polymerizable group may be either a polycondensation polymerizable group or an addition polymerization polymerizable group. The polymerizable group in the invention is preferably an addition polymerization polymerizable group, and more preferably a group containing an ethylenic unsaturated bond, from the viewpoint of particle shape stability in the aqueous medium.

The aromatic group-containing monomer in the present invention is preferably a monomer having an aromatic group derived from an aromatic hydrocarbon and an ethylenic unsaturated bond. One kind of the aromatic group-containing monomer may be used alone or two or more kinds of the aromatic group-containing monomers may be used in combination.

Examples of the aromatic group-containing monomer include phenoxyethyl(meth)acrylate, benzyl(meth)acrylate, phenyl(meth)acrylate, and a styrenic monomer. Of these, from the viewpoints of ink fixing property and the balance between hydrophilicity and hydrophobicity of the polymer chain, an aromatic group-containing (meth)acrylate monomer is preferred, and at least one selected from the group consisting of phenoxyethyl(meth)acrylate, benzyl(meth)acrylate, and phenyl(meth)acrylate is more preferable and, phenoxyethyl(meth)acrylate and benzyl(meth)acrylate are still more preferred.

The expression "(meth)acrylate" means acrylate or methacrylate.

The self-dispersing polymer in the present invention is preferably an acrylic resin having a structural unit derived from a (meth)acrylate monomer, more preferably an acrylic resin having a structural unit derived from a aromatic group-containing (meth)acrylate monomer, and still more preferably an acrylic resin having a structural unit derived from an aromatic group-containing (meth)acrylate monomer at a content of from 10% by mass to 95% by mass. When the content of the aromatic group-containing (meth)acrylate monomer is from 10% by mass to 95% by mass, the stability of a self-emulsification or dispersed state is improved, and, furthermore, an increase in the ink viscosity can be suppressed.

In the invention, the content of the aromatic group-containing (meth)acrylate monomer is preferably from 15% by mass to 90% by mass, more preferably from 15% by mass to 80% by mass, and particularly preferably from 25% by mass to 70% by mass, from the viewpoints of the stability of a self-dispersion state, stabilization of the particle shape in an aqueous medium through hydrophobic interaction between aromatic rings, and reduction in the amount of water-soluble components by imparting appropriate hydrophobicity to the particle.

The self-dispersing polymer of the present invention may, for example, have a structural unit derived from an aromatic group-containing monomer and a structural unit derived from a dissociable group-containing monomer. The self-dispersing polymer may further have an additional structural unit, as necessary.

The monomer for forming the additional structural unit is not particularly limited so long as the monomer for forming the additional structural unit is a monomer that is copolymerizable with the aromatic group-containing monomer and the dissociable group-containing monomer. From the viewpoints of the flexibility of the polymer skeleton and ease of controlling the glass transition temperature (Tg), an alkyl group-containing monomer is preferred.

Examples of the alkyl group-containing monomer include (meth)acrylic ester monomers such as alkyl(meth)acrylates such as methyl(meth)acrylate, ethyl(meth)acrylate, isopropyl (meth)acrylate, n-propyl(meth)acrylate, n-butyl(meth)acrylate, isobutyl(meth)acrylate, t-butyl(meth)acrylate, hexyl (meth)acrylate, and ethylhexyl(meth)acrylate, ethylenic unsaturated monomers having a hydroxyl group (such as hydroxymethyl(meth)acrylate, 2-hydroxyethyl(meth)acrylate, 2-hydroxypropyl(meth)acrylate, 4-hydroxybutyl(meth) acrylate, hydroxypentyl(meth)acrylate, and hydroxyhexyl (meth)acrylate), and dialkylamino alkyl(meth)acrylates (such as dimethylaminoethyl(meth)acrylate); and (meth) acrylamide monomers such as N-hydroxyalkyl(meth)acrylamide (such as N-hydroxymethyl(meth)acrylamide, N-hydroxyethyl(meth)acrylamide and N-hydroxybutyl(meth) acrylamide), and N-alkoxyalkyl(meth)acrylamides (such as N-methoxymethyl(meth)acrylamide, N-ethoxymethyl (meth)acrylamide, N-(n-, iso)butoxymethyl(meth)acrylamide, N-methoxyethyl(meth)acrylamide, N-ethoxyethyl (meth)acrylamide and N-(n-, iso)butoxyethyl(meth) acrylamide).

The molecular weight of the water-insoluble polymer forming the self-dispersing polymer particles is preferably from 3,000 to 200,000, more preferably from 5,000 to 150,000, and further preferably from 10,000 to 100,000, in terms of weight average molecular weight. When the weight average molecular weight is 3,000 or more, the amount of the water-soluble component can be suppressed effectively. Further, when the weight average molecular weight is 200,000 or less, self-dispersion stability can be improved.

The weight average molecular weight is measured by gel permeation chromatography (GPC). A GPC instrument, HLC-8220GPC (trade name, manufactured by Tosoh Corporation) is used, and three columns of TSKgeL Super HZM-H, TSK geL Super HZ4000 and TSK geL Super HZ2000 (trade names, manufactured by Tosoh Corporation, 4.6 mm ID×15 cm) are used, and THF (tetrahydrofuran) is used as an eluent. GPC conditions are as follows. The sample concentration is 0.35% by mass, the flow rate is 0.35 ml/min, the sample injection amount is 10 µl, the measurement temperature is 40° C., and an RI detector (refractive index detector) is used. The calibration curve is determined using eight samples "standard sample TSK standard, polystyrene": "F-40", "F-20", "F-4", "F-1", "A-5000", "A-2500", "A-1000", and "n-propyl benzene" (trade names), manufactured by Tosoh Corporation.

It is preferable that the water-insoluble polymer forming the self-dispersing polymer particles in the invention has a structural unit derived from an aromatic group-containing (meth)acrylate monomer (preferably a structural unit derived from a phenoxyethyl(meth)acrylate and/or a structural unit derived from a benzyl(meth)acrylate) in an amount of, as a copolymerization ratio, from 15% by mass to 80% by mass, with respect to the total mass of the self-dispersing polymer particles, from the viewpoints of controlling the hydrophilic and hydrophobic properties of the polymer.

From the viewpoints of controlling hydrophilic and hydrophobic properties of the polymer, it is also preferable that the water-insoluble polymer has a structural unit derived from an aromatic group-containing (meth)acrylate monomer in an amount of from 15% by mass to 80% by mass with respect to the total mass of the self-dispersing polymer particles as a copolymerization ratio, a structural unit derived from a carboxyl group-containing monomer, and a structural unit derived from an alkyl group-containing monomer (preferably a structural unit derived from an alkyl ester of (meth)acrylic acid), it is more preferable that the water-insoluble polymer has a structural unit derived from phenoxyethyl(meth)acrylate and/or a structural unit derived from a benzyl(meth) acrylate, in an amount of from 15% by mass to 80% by mass as a copolymerization ratio, a structural unit derived from a carboxyl group-containing monomer, and a structural unit derived from an alkyl group-containing monomer (preferably a structural unit derived from an alkyl ester of (meth)acrylic acid having 1 to 4 carbon atoms), and further, the water-insoluble polymer preferably has an acid value of from 25 to 100 and a weight average molecular weight of from 3,000 to 200,000, and more preferably has an acid value of from 25 to 95 and a weight average molecular weight of from 5,000 to 150,000.

Hereinafter, specific examples of the water-insoluble polymer forming the self-dispersing polymer particle (Exemplary compounds B-01 to B-19) are described. However, the present invention is not limited to the examples. The numbers in parentheses indicate the mass ratios of copolymerization components.

B-01: phenoxyethylacrylate/methylmethacrylate/acrylic acid copolymer (50/45/5)

B-02: phenoxyethylacrylate/benzylmethacrylate/isobutylmethacrylate/methacrylic acid copolymer (30/35/29/6)

B-03: phenoxyethyl methacrylate/isobutyl methacrylate/methacrylic acid copolymer (50/44/6)

B-04: phenoxyethyl acrylate/methyl methacrylate/ethylacrylate/acrylic acid copolymer (30/55/10/5)

B-05: benzyl methacrylate/isobutyl methacrylate/methacrylic acid copolymer (35/59/6)

B-06: styrene/phenoxyethylacrylate/methyl methacrylate/acrylic acid copolymer (10/50/35/5)

B-07: benzylacrylate/methyl methacrylate/acrylic acid copolymer (55/40/5)

B-08: phenoxyethyl methacrylate/benzyl acrylate/methacrylic acid copolymer (45/47/8)

B-09: styrene/phenoxyethyl acrylate/butyl methacrylate/acrylic acid copolymer (5/48/40/7)

B-10: benzyl methacrylate/isobutyl methacrylate/cyclohexyl methacrylate/methacrylic acid copolymer (35/30/30/5)

B-11: phenoxyethyl acrylate/methyl methacrylate/butyl acrylate/methacrylic acid copolymer (12/50/30/8)

B-12: benzyl acrylate/isobutyl methacrylate/acrylic acid copolymer (93/2/5)

B-13: styrene/phenoxyethyl methacrylate/butylacrylate/acrylic acid copolymer (50/5/20/25)

B-14: styrene/butylacrylate/acrylic acid copolymer (62/35/3)

B-15: methyl methacrylate/phenoxyethyl acrylate/acrylic acid copolymer (45/51/4)

B-16: methyl methacrylate/phenoxyethyl acrylate/acrylic acid copolymer (45/49/6)

B-17: methyl methacrylate/phenoxyethyl acrylate/acrylic acid copolymer (45/48/7)

B-18: methyl methacrylate/phenoxyethyl acrylate/acrylic acid copolymer (45/47/8)

B-19: methyl methacrylate/phenoxyethyl acrylate/acrylic acid copolymer (45/45/10)

The average particle diameter of the self-dispersing polymer particles is preferably from 10 nm to 400 nm, more preferably from 10 nm to 200 nm, and even more preferably from 10 nm to 100 nm, in terms of a volume average particle diameter. When the volume average particle diameter is 10 nm or more, preparation suitability is improved and when the volume average particle diameter is 400 nm or less, storage stability is improved.

The particle diameter distribution of the self-dispersing polymer is not particularly limited and may be a broad particle diameter distribution or a mono-dispersed particle diameter distribution. The water-insoluble particle (self-dispersing polymer particle) may be used alone or two or more kinds of water-insoluble particles maybe used in combination.

The average particle diameter and particle diameter distribution of the self-dispersing polymer particles is determined by measuring the volume average particle diameter by a dynamic light scattering method using a NANOTRAC particle size measuring instrument (trade name: UPA-EX150, manufactured by NIKKISO CO., LTD.).

One kind of the self-dispersing polymer particle may be used alone, or two or more kinds of the self-dispersing polymer particles may be mixed and used. The content of the self-dispersing polymer particles in the ink composition is preferably from 0.1% by mass to 30% by mass, and more preferably from 0.5% by mass to 10% by mass, with respect to the mass of ink composition, from the viewpoints of aggregation speed and image gloss.

A content ratio of the pigment and the self-dispersing polymer particle in the ink composition (for example, water-insoluble pigment particle/self-dispersing polymer particle) is preferably from 1/0.1 to 1/10, and more preferably from 1/0.2 to 1/4, from the viewpoints of abrasion resistance of an image.

Water-Soluble Organic Solvent

The ink composition of the present invention may contain at least one water-soluble organic solvent. The water-soluble organic solvent can produce effects of moistening, prevention of drying, or penetration acceleration. For prevention of drying, the water-soluble organic solvent is used as an anti-drying agent that prevents clogging of ink jetting ports of a jetting nozzle by aggregates formed by the ink stuck and dried thereon. A water-soluble organic solvent having a lower vapor pressure than that of water is preferably used for moistening or prevention of drying. For penetration acceleration, the water-soluble organic solvent is added as a penetration accelerating agent that increases in ink-penetrating property into paper.

The anti-drying agent is preferably a water-soluble organic solvent having a lower vapor pressure than that of water. Specific examples of the water-soluble organic solvent as an anti-drying agent include polyhydric alcohols represented by, for example, ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane; lower alkylethers of polyhydric alcohols such as ethylene glycol monomethyl (or ethyl)ether, diethylene glycol monomethyl (or ethyl)ether, and triethylene glycol monoethyl (or butyl) ether; heterocycles such as 2-pyrrolidone, N-methyl-2-pyrrolidone, 1,3-dimethyl-2-imidazolidinone, and N-ethyl morpholine; sulfur-containing compounds such as sulfolane, dimethylsulfoxide or 3-sulfolene; polyfunctional compounds such as diacetone alcohol and diethanol amine; and urea derivatives.

Of these, polyhydric alcohols such as glycerin and diethylene glycol are preferable as the anti-drying agent.

The anti-drying agent may be used alone or in a combination of two or more thereof. The content of the anti-drying agent in the ink composition is preferably from 10% by mass to 50% by mass with respect to the ink composition.

As a penetration accelerating agent, a water-soluble organic solvent is preferable for the purpose of better penetration of the ink composition into a recording medium (a printing paper or the like). Specific examples of the preferred water-soluble organic solvent as a penetration accelerating agent include alcohols such as ethanol, iso-propanol, butanol, di(tri)ethyleneglycol monobutyl ether and 1,2-hexanediol, lauryl sodium sulfate, sodium oleate and nonionic surfactants.

The penetration accelerating agent may be used alone or in combination of two or more thereof. The content of the penetration accelerating agent is preferably from 5% by mass to 30% by mass in the ink composition. The content of the penetration accelerating agent is preferably used within a range in which the penetration accelerating agent does not cause bleed or print-through of an image.

Further, the water-soluble organic solvent is used for controlling viscosity. Specific examples of the water-soluble organic solvent used for controlling viscosity include alcohols (for example, methanol, ethanol, propanol, isopropanol, butanol, isobutanol, sec-butanol, t-butanol, pentanol, hexanol, cyclohexanol, and benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethylenimine, and tetramethylpropylenediamine), and other polar solvents (for example, formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone). In this case, the water-soluble organic solvent may be used alone or in a combination of two or more thereof.

Water

The ink composition contains water, and the amount of water is not particularly limited. However, the content of water is preferably from 10% by mass to 99% by mass, more preferably from 30% by mass to 80% by mass, and still more preferably from 50% by mass to 80% by mass, with respect to the ink composition.

Other Additives

The scope of the ink composition in the present invention may further include other additives other than the above components. Examples of the other additives include a known additive such as an anti-drying agent (moistening agent), an anti-fading agent, an emulsification stabilizer, a penetration accelerating agent, an ultraviolet absorbing agent, a preservative, an antifungal agent, a pH adjuster, a surface tension adjuster, a defoamer, a viscosity modifier, a dispersion stabilizer, an anticorrosive agent, or a chelating agent. When these additives are added to the ink composition, these additives are usually directly added to the ink. When an oil dye is used as a dispersion, these additives are usually added to the dispersion after the preparation of a dye dispersion. However, the additives may be added to an oil phase or an aqueous phase during the preparation of the dye dispersion.

The ultraviolet absorbing agent can improve the storability of an image. Examples of the ultraviolet absorbing agent include benzotriazole-containing compounds such as those described in JP-A No. 58-185677, JP-A No. 61-190537, JP-A No. 2-782, JP-A No. 5-197075, and JP-A No. 9-34057; benzophenone-containing compounds such as those described in JP-A No. 46-2784, JP-A No. 5-194483, and U.S. Pat. No. 3,214,463; cinnamic acid-containing compounds such as those described in Japanese Examined Patent Application Publication (JP-B) No. 48-30492, JP-B No. 56-21141, and JP-A No. 10-88106; triazine-containing compounds such as those described in JP-A No. 4-298503, JP-A No. 8-53427, JP-A No. 8-239368, JP-A No. 10-182621, and PCT Japanese Translation Patent Publication (JP-T) No. 8-501291, compounds described in Research Disclosure No. 24239 and compounds as so-called fluorescent brighteners that emit fluorescent light upon absorption of UV rays such as stilbene-containing compounds and benzoxazole-containing compounds.

The anti-fading agent can improve the storability of an image. Examples of the anti-fading agent include an organic anti-fading agent and a metal complex anti-fading agent. Examples of the organic anti-fading agent include hydroquinones, alkoxy phenols, dialkoxy phenols, phenols, anilines, amines, indanes, chromanes, alkoxy anilines, and heterocyeles. Examples of the metal complex anti-fading agent include nickel complexes and zinc complexes. More specific examples thereof include compounds such as those described in patents cited in the section I or J in Chapter VII of Research Disclosure No. 17643, Research Disclosure No. 15162, in the left column on page 650 of Research Disclosure No. 18716, in page 527 of Research Disclosure No. 36544, in page 872 of Research Disclosure No. 307105, Research Disclosure No. 15162 and compounds within the scope of the formulae and examples of the representative compounds described in pages 127 to 137 of JP-A No. 62-215272.

Examples of the antifungal agent include sodium dehydroacetate, sodium benzoate, sodium pyridinethione-1-oxide, p-hydroxy benzoate ethyl ester, 1,2-benzisothiazoline-3-one and a salt thereof. The content of the antifungal agent is preferably in a range of from 0.02% by mass to 1.00% by mass with respect to the ink composition.

As the pH adjuster, a neutralizing agent (organic base, inorganic alkali) may be used. The pH adjuster can improve the stability of the ink composition during storage. The pH adjuster is added to the extent that the pH of the ink composition is preferably from 6 to 10, and more preferably from 7 to 10.

Examples of the surface tension adjuster include nonionic surfactants, cationic surfactants, anionic surfactants, and betaine surfactants.

The amount of the surface tension adjuster is preferably added in such an amount that the surface tension of the ink composition is preferably in a range of from 20 mN/m to 60 mN/m, more preferably in a range of from 20 mN/m to 45 mN/m, and still more preferably in a range of from 25 mN/m to 40 mN/m. When the surface tension adjuster is added in an amount in the above range, the ink composition is jetted in a favorable manner using an ink jet method.

Specific preferable examples of the surfactant include, as hydrocarbon surfactants, anionic surfactants such as fatty acid salt, alkyl sulfate ester salt, alkyl benzene sulfonate, alkyl naphthalene sulfonate, dialkyl sulfosuccinate, alkyl phosphate ester salt, naphthalene sulfonate formalin condensate, or polyoxyethylene alkyl sulfate ester salt; and nonionic surfactants such as polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkyl amine, glycerin fatty acid ester, or oxyethylene oxypropylene block copolymer. In addition, acetylene-based polyoxyethylene oxide surfactants such as SURFYNOLS (trade name, manufactured by Air Products & Chemicals Inc.) are also preferably used. In addition, an amine oxide-type ampholytic surfactant such as N,N-dimethyl-N-alkyl amine oxide is also preferred.

Furthermore, surfactants described in pages 37 and 38 of JP-A No. 59-157636 and Research Disclosure No. 308119 (in 1989) may also be used.

By using, for example, fluorine (alkyl fluoride) surfactants or silicone surfactants described in JP-A No. 2003-322926, JP-A No. 2004-325707, and JP-A No. 2004-309806, abrasion resistance can be improved.

These surface tension adjusters may also be used as a defoamer, and chelating agents represented by fluorine compounds, silicone compounds, and EDTA may also be used.

Ink Set

The ink set of the present invention is not limited as long as the ink set includes the ink composition of the present invention described above and a treatment liquid containing an aggregating agent that is capable of aggregating components in the ink composition.

When the ink set of the present invention is an ink set including, for example, at least a cyan ink, a magenta ink, a yellow ink and a black ink, at least one of the cyan ink, the magenta ink, the yellow ink, and the black ink may be the ink composition of the present invention, but all of them are preferably the ink composition of the present invention.

Particularly, when the ink set includes two or more of the ink compositions of the present invention, for example, when the ink set of the present invention include a first ink composition and a second ink composition and an inkjet recording method is performed using the ink set of the present invention by applying the first ink composition of the present invention and the second ink composition of the present invention, in this order, the number of particles contained in the second ink composition having a particle diameter of 0.8 μm or more is preferably less than the number of particles contained in the first ink composition having a particle diameter of 0.8 μm or more. That is, the number of the coarse particles in the second ink composition (the second ink composition is the ink composition of the present invention that is applied to the recording medium after application of the first ink composition) is preferably less than the number of the coarse particles in the first ink composition (the first ink composition is the ink composition of the present invention that is applied to the recording medium before application of the second ink composition). As a result, the number of coarse particles present at the interface between the applied first ink composition and the applied second ink composition decreases, whereby polymerization reaction is performed uniformly, as a result of which abrasion resistance of a secondary color image is improved, and good image forming properties can be obtained.

Treatment Liquid

The treatment liquid includes at least an aggregating agent that is capable of aggregating the above-described components in the ink composition, but may further contain other components if necessary. Since the treatment liquid is used with the ink composition, ink jet recording can be performed at a higher speed, and an image excellent in terms of the image-printing properties with a high density and high resolution (for example, reproducibility of thin lines and minute portions) can be obtained even when recording is performed at a high-speed.

The aggregating agent may be a compound that is capable of changing the pH of the ink composition, a polyvalent metal salt, or a polyallylamine. In the present invention, from the viewpoints of the aggregating property of the ink composition, a compound that is capable of changing the pH of the ink composition is preferable, and a compound that is capable of decreasing the pH of the ink composition is more preferable.

Examples of the compound capable of decreasing the pH of the ink composition include an acidic substance.

Preferable examples of the acidic substance include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumalic acid: thiophene carboxylic acid, nicotine acid, and derivatives thereof, and salts thereof.

One kind of the acidic substance may be used alone or two or more kinds of the acidic substances may be used in combination.

When the treatment liquid in the present invention includes an acidic substance, the pH (25° C.) of the treatment liquid is preferably 6 or less, and more preferably 4 or less. In particular, the pH (25° C.) is preferably in a range of from 1 to 4, and particularly preferably in a range of from 1 to 3. In such a case, the pH (25° C.) of the ink composition is preferably 7.5 or more (more preferably 8.0 or more).

Among the above, from the viewpoints of image density, resolution, and an ink jet recording at a higher speed, it is preferable that the pH (25° C.) of the ink composition is 8.0 or more and the pH (25° C.) of the treatment liquid is from 0.5 to 4.

Among the above, as the aggregating agent in the present invention, a highly water-soluble acidic substance is preferable. From the viewpoints of increasing aggregation property and immobilizing the entire ink, the aggregating agent in the present invention is preferably an organic acid, more preferably a di or higher-valent organic acid, and particularly preferably a divalent to trivalent organic acid. The di or higher-valent organic acid is preferably an organic acid having a first pKa of 3.5 or less, and more preferably an organic acid having a first pKa of 3.0 or less. Specific preferable examples thereof include phosphoric acid, oxalic acid, malonic acid, and citric acid.

Examples of the polyvalent metal salt include a salt of alkali earth metal which belongs to Group 2 of the periodic table (for example, magnesium and calcium), a salt of transition metal which belongs to Group 3 of the periodic table (for example, lanthanum), a salt of a metal from Group 13 of the periodic table (for example, aluminum), and a salt of lanthanides (for example, neodymium). Preferable examples of the salt of the above metals include carboxylic acid salt (such as formate, acetate, or benzoate), nitrate, chloride, and thiocyanate. Among them, a calcium salt or magnesium salt of carboxylic acid (formic acid, acetic acid, and benzoic acid), a calcium salt or magnesium salt of nitric acid, calcium chloride, magnesium chloride, and a calcium salt or magnesium salt of thiocyanic acid are preferable.

With respect to the aggregating agent, one kind of the aggregating agent may be used alone or two or more kinds of the aggregating agents may be mixed and used.

The content of the aggregating agent in the treatment liquid that is capable of aggregating the ink composition is preferably from 1% by mass to 50% by mass, more preferably from 3% by mass to 45% by mass, and still more preferably from 5% by mass to 40% by mass with respect to the treatment liquid.

The treatment liquid may further contain other additives as additional components as long as the effects of the present invention are not impaired. Examples of other additives include known additives such as an anti-drying agent (moistening agent), an anti-fading agent, an emulsification stabilizer, a penetration accelerating agent, an ultraviolet absorbing agent, a preservative, an antifungal agent, a pH adjuster, a surface tension adjuster, a defoamer, a viscosity modifier, a dispersant, a dispersion stabilizer, an anticorrosive agent, and a chelating agent.

In a preferred ink set of the present invention, it is preferable that the ink set is a combination of a treatment liquid containing an organic acid and an ink composition containing a nonionic tri- to penta-functional water-soluble monomer as a polymerizable monomer, a water-dispersible pigment that is coated with a polymer dispersant having a carboxyl group and an acid value of from 100 mg KOH/g or less, and a self-dispersing polymer particle having an acid value of from 50 mg KOH/g or less. It is more preferable that the ink set is a combination of a treatment liquid containing a divalent (or more) organic acid and an ink composition containing a nonionic tri- to tetra-functional water-soluble acrylate monomer as a polymerizable monomer, a water-dispersible pigment that is coated with a polymer dispersant having a carboxyl group and an acid value of from 25 mg KOH/g to 80 mg KOH/g, and a self-dispersing polymer particle having an acid value of from 25 mg KOH/g to 50 mg KOH/g. In addition to satisfying the above preferable condition, it is particularly preferable that an ink set in which the self-dispersing polymer particle is an acrylic resin particle having a structural unit derived from (meth)acrylate monomer.

Inkjet Recording Method

The scope of the inkjet recording method of the present invention may include an ink application process of applying the ink composition described above to a recording medium by ink jetting (an inkjet method). In addition, the scope of the inkjet recording method may further include a treatment liquid application process of applying a treatment liquid containing an aggregating agent that is capable of aggregating components in the ink composition to the recording medium, as necessary. As a result, a recorded image exerts superior abrasion resistance and image forming properties. The scope of the inkjet recording method of the present invention may further include additional processes as necessary.

Hereinafter, respective processes in the inkjet recording method of the present invention are described in detail.

Ink Application Process

The applying the ink composition (ink application process) includes applying, to a recording medium, an ink composition containing at least a pigment, water, a polymerizable monomer that is capable of being polymerized by an active energy ray, and an initiator that is capable of initiating polymerization of the polymerizable monomer by the active energy ray by an inkjet method, wherein the number of particles contained in the ink composition having a particle diameter of 0.8 μm or more is 20,000 particles/μl or less. In the process, the ink composition can be selectively applied to the recording medium and a desired visible image can be thus formed. The ink composition contains at least a pigment, a polymerizable monomer, an initiator and water, and details of the ink composition such as details and preferred embodiments of respective components are as described above.

When a secondary (or higher) color image is recorded using the ink composition of the present invention, it is preferable that the first ink composition and the second ink composition having the number of the coarse particles that is less than the number of the coarse particles contained in the first ink composition are used, the first ink composition is first applied to the recording medium to form a first recording layer, and the second ink composition is then applied to the first recording layer to form a second recording layer. As a result, image forming properties as well as abrasion resistance of a secondary (or higher) color image can be improved.

Specifically, image recording by an ink jet method may be conducted by jetting a liquid composition onto a desired recording medium by application of energy. The recording medium is, for example, a common paper, a resin coated paper, a paper exclusively for inkjet recording described in, for example, JP-A No. 8-169172, JP-A No. 8-27693, JP-A No. 2-276670, JP-A No. 7-276789, JP-A No. 9-323475, JP-A No. 62-238783, JP-A No. 10-153989, JP-A No. 10-217473, JP-A No. 10-235995, JP-A No. 10-337947, JP-A No. 10-217597, and JP-A 10-337947, a film, an electrophotographic paper, a fabric, glass, a metal, and a ceramic. Examples of preferable ink jet recording methods for the present invention may include a method described in paragraphs [0093] to [0105] of JP-A No. 2003-306623.

The ink jet method is not particularly limited, and may be any known method such as a charge-control method in which an ink is jetted by an electrostatic attraction force, a drop-on-demand method (pressure-pulse method) in which a pressure of oscillation of a piezo element is utilized, an acoustic ink jet method in which an ink is jetted by radiation pressure generated by irradiation of ink with acoustic beams that have been converted from electrical signals, and a thermal ink jet (BUBBLE JET (registered trade mark)) method in which an ink is jetted by a pressure generated by formation of bubbles caused by heating of the ink. As the inkjet method, an inkjet method is described in JP-A No. 54-59936 and can be utilized effectively; in this method, an ink is jetted from a nozzle by an acting force generated by an abrupt volume change of the ink caused by application of a thermal energy to the ink.

The scope of the ink jet method may include a method in which a large number of small-volume droplets of an ink having a low optical density, which is called a photo ink, are jetted, a method in which plural inks with substantially the same hue but different densities are used to improve image quality, and a method in which a colorless and transparent ink is used.

The inkjet head used for the inkjet method may be an on-demand system or a continuous system. Examples of an jetting method include electromechanical transduction systems (for example, single cavity system, double cavity system, vendor system, piston system, share mode system, and shared wall system), electrothermal transduction systems (for example, thermal inkjet system and BUBBLE JET (registered trademark) system), electrostatic suction systems (for example, electric-field control system and slit jet system) and electrical discharge systems (for example, spark jet system), and any jetting system may be used.

The ink nozzle used for recording by the inkjet method is not particularly limited and may be suitably selected according to the purpose.

The amount of the ink droplets jetted from an inkjet head is preferably from 1 pl (picoliter) to 10 pl, and more preferably from 1.5 pl to 6 pl, from the viewpoints of obtaining a high-precision image. It is also effective to jet liquid droplets of different amounts in combination, from the viewpoints of suppressing unevenness in an image and improving smoothness in continuous gradation. Jetting liquid droplets of different amounts in combination may be favorably applied to the present invention.

Treatment Liquid Application Process

In the treatment liquid application process, a treatment liquid including an aggregating agent that is capable of aggregating components in the ink composition is applied onto a recording medium. The applied treatment liquid contacts the ink composition to form an image. In this case, dispersed particles in the ink composition such as the pigment, the polymer particles, and the like are aggregated, whereby the image is fixed onto the recording medium. The treatment liquid includes at least an aggregating agent, and details and preferred embodiments of the respective components are described below.

The treatment liquid may be applied by a known method such as a coating method, an ink jet method, or an immersion method. Examples of the coating method include known coating methods using a bar coater, an extrusion die coater, an air doctor coater, a blade coater, a rod coater, a knife coater, a squeeze coater, and a reverse roll coater. Details of the ink jet method are the same as those described above.

The treatment liquid application process may be performed before or after the ink application process using the ink composition. In the present invention, an embodiment in which the ink application process is performed after the treatment liquid is applied in the treatment liquid application process is preferable. Specifically, it is preferable that the treatment liquid for aggregating the pigment and/or self-dispersing polymer particles in the ink composition is applied in advance on the recording medium prior to applying the ink composition, and the ink composition is applied so as to contact with the treatment liquid provided on the recording medium, whereby an image is formed. As a result, inkjet recording can be performed at a higher speed, and an image having high density and resolution can be obtained even when recording is performed at a high speed.

The amount of the treatment liquid to be applied is not particularly limited as long as the ink composition can be aggregated, and is preferably an amount such that the amount of the aggregating agent to be applied is 0.1 g/m$^2$ or more. The amount of the aggregating agent to be applied is more preferably from 0.2 g/m$^2$ to 0.7 g/m$^2$. When the amount of the aggregating agent to be applied is 0.1 g/m$^2$ or more, superior high-speed aggregation properties which are suitable for various modes of the use of the ink composition can be maintained. It is preferable that the amount of the aggregating agent to be applied is 0.7 g/m$^2$ or less so that there is no disadvantageous influence on the surface properties (such as change in gloss and the like) of the recording medium on which the treatment liquid is applied.

In the present invention, it is preferable that the ink application process is performed after the treatment liquid application process, and further, a heat-drying process of drying the treatment liquid on a recording medium by heating is performed during a time period after the application of the treatment liquid on a recording medium until the application of the ink composition. By drying the treatment liquid by heating prior to the ink application process, the ink coloring properties such as suppression of bleed are improved, and a visible image having superior color density and hue can be recorded.

The drying by heating may be performed by a known heating means such as a heater or the like, or an air-blowing means using air-blowing by a drier or the like, or a means having a combination thereof. Examples of heating methods include a method of supplying heat from the side of the recording medium opposite to the surface on which the treatment liquid has been applied using a heater or the like, a method of blowing warm air or hot air to the recording medium on which the treatment liquid has been applied, and a heating method using an infrared heater, and a combination of two or more of the above methods.

Recording Medium

According to the inkjet recording method of the present invention, an image is recorded on a recording medium.

The recording medium is not particularly limited, and may be a general printing paper containing cellulose as the major component such as high-quality paper, coat paper, or art paper, which is used for general offset printing and the like. When image recording is performed on the general printing paper containing cellulose as the major component by a general inkjet method using an aqueous ink, absorption and drying of the ink is relatively slow, and colorant migration likely occurs after jetting ink droplets, whereby image quality is apt to degrade. In contrast, when image recording is conducted by the image forming method according to the present invention, a high-grade image recording having excellent color density and hue can be achieved while suppressing the colorant migration.

The recording medium may be a commercially-available product, and examples thereof include high-quality papers (A) such as PRINCE WOOD FREE (trade name) manufactured by Oji Paper Co., Ltd., SHIRAOI (trade name) manufactured by Nippon Paper Industries Co., Ltd., and New NPI jo-shitsu (New NPI high-quality; trade name) manufactured by Nippon Paper Industries Co., Ltd.; very light-weight coated papers such as EVER LIGHT COATED (trade name) manufactured by Oji Paper Co., Ltd. and AURORA S (trade name) manufactured by Nippon Paper Industries Co., Ltd.; lightweight coat papers (A3) such as TOPKOTE (L) (trade name) manufactured by Oji Paper Co., Ltd. and AURORA L (trade name) manufactured by Nippon Paper Industries Co., Ltd.; coat papers (A2, B2) such as TOPKOTE PLUS (trade name) manufactured by Oji Paper Co., Ltd. and AURORA COAT (trade name) manufactured by Nippon Paper Industries Co., Ltd.; and art papers (A1) such as KINFUJI(2/SIDE GOLDEN CASK GLOSS) (trade name) manufactured by Oji Paper Co., Ltd. and TOKUBISHI ART (trade name) manufactured by Mitsubishi Paper Mills Ltd. As the recording medium, various inkjet-recording papers exclusively for photos may be used.

Among these recording media, a coated paper, which is used for general offset printing, is preferable. The coated paper is produced generally by coating a surface of a base paper which contains cellulose as a main component and has not been subjected to surface treatment such as high-quality paper, neutral paper, and the like with a coating material so as to form a coating layer. When image formation is performed with a typical aqueous inkjet, the coated paper tends to cause problems in quality such as image gloss, abrasion resistance, and the like. However, unevenness in gloss is suppressed and an image having excellent gloss and abrasion resistance can be obtained according to the inkjet recording method of the present invention. In particular, it is preferable to use a coated paper having a base paper and a coated layer containing an inorganic pigment, and it is more preferable to use a coated paper having a base paper and a coated layer containing kaolin and/or calcium bicarbonate. Specifically, an art paper, a coat paper, a light-weight coat paper, and a very light-weight coated paper are preferable.

Inkjet Recording Device

Next, an example of an inkjet recording device that is preferable for performing the inkjet recording method of the present invention is explained in detail with reference to FIG. 1. FIG. 1 is a schematic diagram showing an example of a configuration of an entire inkjet recording device.

As shown in FIG. 1, the inkjet recording device includes: a treatment liquid application unit 12 having a treatment liquid jetting head 12S that jets the treatment liquid; a treatment liquid drying zone 13 having a heating means (not shown) that dries the applied treatment liquid; an ink jetting unit 14 that jets various ink compositions; and an ink drying zone 15 at which the jetted ink composition is dried, in this order in the conveyance direction of the recording medium (the direction of the arrow shown in the FIGURE). An ultraviolet ray irradiation unit 16 having an ultraviolet ray irradiation lamp 16S, is provided downstream of the ink drying zone 15 in the conveyance direction of the recording medium.

The recording medium that has been supplied to the inkjet recording device is conveyed by conveyance rollers from a feed unit for feeding a recording medium from a' case charged with the recording medium to the treatment liquid application unit 12, then to the treatment liquid drying zone 13, then to the ink jetting unit 14, then to the ink drying zone 15, and then to the ultraviolet ray irradiation unit 16, and then accumulated in an accumulation unit. The conveyance of the recording medium may be conducted by the method using conveyance rollers, a drum conveyance method using a drum-shaped member, a belt conveyance method, or a stage conveyance method using a stage.

Among the plural conveyance rollers provided in the inkjet recording device, at least one roller may be a drive roller to which a force generated by a motor (not shown) is transmitted. When the drive roller is rotated by the motor at a constant rate, the recording medium is conveyed in a predetermined direction at a predetermined conveyance amount.

The treatment liquid application unit 12 has the treatment liquid jetting head 12S, which is connected to a storage tank in which the treatment liquid is stored. The treatment liquid jetting head 12S jets the treatment liquid from jetting nozzles placed to face a recording surface of the recording medium so that droplets of the treatment liquid can be applied onto the recording medium. The method used in the treatment liquid application unit 12 is not limited to a method of jetting from a head in the form of a nozzle, and may be a coating method using a coating roller. According to the coating method, the treatment liquid may be readily applied to almost a whole of one surface of the recording medium, including an image portion on which ink droplets are to be spotted by the ink jetting unit 14 provided at the downstream side. In order to make the thickness of the treatment liquid applied onto the recording medium uniform, an air-knife may be used, a method of providing a member having an acute angle to give a gap between the member and the recording medium that corresponds to a specific amount of the treatment liquid, or the like may be provided.

The treatment liquid drying zone 13 is positioned downstream of the treatment liquid application unit 12 in the conveyance direction of the recording medium. The treatment liquid drying zone 13 may include: a known heating means such as a heater or the like; an air blowing means using air blowing such as a dryer or the like; or a combination thereof. Examples of the heating means include a method of providing a heat-generating member such as a heater at a side of the recording medium opposite to the surface on which the treatment liquid is applied (for example, when the recording medium is conveyed automatically, the heat-generating member may be positioned, below the conveyance system that conveys the recording medium placed thereon); and a method of blowing warm or hot air onto the surface of the recording medium on which the treatment liquid is applied; a heating method of using an infrared ray heater. These methods may be used in combination.

Since the surface temperature of the recording medium varies depending on the type of the recording medium (materials, thickness, and the like) and an environmental temperature, it is preferable to dry the treatment liquid (to form a treatment liquid application layer) while regulating the surface temperature by a heating control unit using a system including a measurement unit that measures the surface temperature of the recording medium and a regulation mechanism that provides the heating control unit feedback on the surface temperature of the recording medium measured by the measurement unit. The measurement unit for measuring the surface temperature of the recording medium is preferably a contact-type or non-contact type thermometer.

The solvent may be removed using a solvent-removing roller or the like. In an alternative embodiment, a method in which excess solvent is removed from the recording medium by an air knife may also be used.

The ink jetting unit 14 is positioned downstream of the treatment liquid drying zone 13 with respect to the conveyance direction of the recording medium. The ink jetting unit 14 includes recording heads (ink jetting heads) 30K, 30C, 30M, and 30Y, which are connected to respective ink reservoirs that store inks of black (K), cyan (C), magenta (M), and yellow (Y), respectively. Each ink reservoir (not shown) stores an ink composition containing a pigment of a corresponding color, resin particles, a water-soluble organic solvent, and water, and supplies each of the inks to the corresponding ink jetting heads 30K, 30C, 30M, and 30Y, if necessary, when image recording is performed. As shown in FIG. 1, recording heads 30A and 30B for jetting the inks of specific colors may be further provided, which are positioned downstream of the ink jetting heads 30K, 30C, 30M, and 30Y with respect to the conveyance direction of the recording medium, so that the inkjet recording heads 30A and 30B jet the inks having specific colors, if necessary.

Each of the ink jetting heads 30K, 30C, 30M, and 30Y jets ink corresponding to an image to be formed from the jetting nozzles that are positioned to face the recording surface of the recording medium. In this way, inks of the respective colors are applied to the recording surface of the recording medium and a color image is recorded.

The treatment liquid jetting head 12S and the ink jetting heads 30K, 30C, 30M, 30Y, 30A, and 30B are each in the form of full-line head in which a number of jetting ports (nozzles) are aligned along the maximum recording width of the image to be recorded on the recording medium (maximum recording width). In this form, image recording on a recording medium is carried out at higher speed compared to serial-type recording in which recording is carried out using a short-length shuttle head that reciprocates in the width direction of the recording medium (a direction on a main face of the recording medium that is orthogonal to the conveyance direction of the recording medium) in a scanning manner. In the present invention, either of the above serial-type recording method or a recording method capable of recording at relatively high speed such as a single-path system in which an image is formed in one scanning-movement by jetting using a line head while moving the recording medium relative to the line head in the main scanning direction, may be employed. In the image recording method of the present invention, a high-quality image having high reproducibility may be obtained in the single-path system.

Herein, the treatment liquid jetting head 12S and the ink jetting heads 30K, 30C, 30M, 30Y, 30A, and 30B have the same structure.

The application amount of the treatment liquid and the application amount of the ink composition are preferably regulated, if necessary. For example, the application amount of the treatment liquid may be changed according to the type of the recording medium, in order to, for example, adjust the properties such as viscoelasticity of the aggregates formed upon mixing of the treatment liquid and the ink composition, and the like.

The ink drying zone 15 is positioned downstream of the ink jetting unit 14 in the conveyance direction of the recording medium. The ink drying zone 15 may have a structure similar to that of the treatment liquid drying zone 13.

The ultraviolet ray irradiation unit 16 is disposed further downstream of the ink drying zone 15 in the conveyance direction of the recording medium, and emits an ultraviolet ray from the ultraviolet ray irradiation lamp 16S provided in the ultraviolet ray irradiation unit 16, thereby polymerizing and curing the monomer components contained in an image after drying of the image. The ultraviolet ray irradiation lamp 16S is a lamp which is disposed to face the recording surface of the recording medium, and with which the entire recording surface is irradiated to cure the entire image. The ultraviolet ray irradiation unit 16 is not limited to the ultraviolet ray irradiation lamp 16S, and it is also possible to employ a halogen lamp, a high-pressure mercury lamp, a laser, an LED, an electron-beam irradiation device, or the like.

The ultraviolet ray irradiation unit 16 may be provided either before or after the ink drying zone 15, or the ultraviolet ray irradiation unit 16 may be provided both before and after the ink drying zone 15.

The inkjet recording device may further include a heating means on a conveyance path from the feed unit to the accumulation unit, in order to conduct a heat treatment on the recording medium. For example, by providing a heating means at a desired position such as upstream of the treatment liquid drying zone 13, between the ink jetting unit 14 and the ink drying zone 15, or the like, the temperature of the recording medium can be increased to a desired temperature, at which drying and fixing is performed effectively.

Examples

Hereinafter, the present invention is further described in detail with reference to Examples. However, the present invention is not limited to these Examples as long as it does not depart from the original gist thereof. Moreover, the term "part(s)" and "%" are based on mass, respectively, unless otherwise noted.

Examples and Comparative Examples

Preparation of Aqueous UV Ink
Preparation of Cyan Ink
Preparation of Polymer Dispersion Liquid 6 parts of styrene, 11 parts of stearyl methacrylate, 4 parts of styrene macromer AS-6 (trade name, manufactured by Toagosei Co., Ltd.), 5 parts of BLEMMER PP-500 (trade name, manufactured by NOF Corporation), 5 parts of methacrylic acid, 0.05 parts of 2-mercaptoethanol, and 24 parts of methyl ethyl ketone were added into a reaction vessel to prepare a mixed solution 1.

14 parts of styrene, 29 parts of stearyl methacrylate, 9 parts of styrene macromer AS-6 (trade name, manufactured by Toagosei Co., Ltd.), 9 parts of BLEMMER PP-500 (trade name, manufactured by NOF Corporation), 5 parts of methacrylic acid, 0.13 parts of 2-mercaptoethanol, 56 parts of methyl ethyl ketone, and 1.2 parts of 2,2'-azobis(2,4-dimethylvaleronitrile) were added into a dropping funnel to prepare a mixed solution 2.

Subsequently, in a nitrogen atmosphere, the mixed solution 1 in the reaction vessel was heated to 75° C. while stirring, and the mixed solution 2 in the dropping funnel was gradually dropped into the reaction vessel over one hour. Two hours after the completion of the dropping, a solution in which 1.2 parts of 2,2'-azobis(2,4-dimethylvaleronitrile) was dissolved in 12 parts of methyl ethyl ketone was dropped into the reaction vessel over 3 hours. The mixed solution was further aged at 75° C. for 2 hours and then at 80° C. for 2 hours. As a result, a polymer dispersion liquid was obtained.

A part of the obtained polymer dispersion liquid was isolated by removing the solvent, and the obtained solid content was diluted with tetrahydrofuran to 0.1% by mass. The diluted solid content of the polymer dispersion liquid was subjected to high-speed GPC (gel permeation chromatography) by HLC-8220 GPC (trade name) with three columns of TSKgeL Super HZM-H, TSKgeL Super HZ4000, and TSKgeL Super HZ2000 (trade names, all manufactured by Tosoh Corporation) connected in series, and the weight average molecular weight was measured. As a result, the weight average molecular weight was 25,000 calculated in terms of polystyrene. Further, the acid value was 67 mgKOH/g.

Next, 5.0 g in terms of the solid content of the polymer dispersion liquid obtained above, 10.0 g of a cyan pigment, PIGMENT BLUE 15:3 (trade name, manufactured by Dainichiseika Color & Chemicals Mfg. Co., Ltd.), 40.0 g of methyl ethyl ketone, 8.0 g of 1 mol/L (liter; this shall apply hereinafter) sodium hydroxide, and 82.0 g of ion exchange water were put in a vessel together with 300 g of 0.1 mm zirconia beads, and were dispersed at from 1,000 rpm to 1,200 rpm using an explosion-proof parallel 4-cylinder batch type sand grinder, LSG 4U-08 (trade name, manufactured by Aimex Co., Ltd.) until a desired particle diameter was obtained. The resulting dispersion liquid was condensed under a reduced pressure using an evaporator until methyl ethyl ketone was sufficiently removed by distillation, and the dispersion liquid was further condensed until the concentration of the pigment reached 10%. As a result, a cyan pigment dispersion liquid in which the water-dispersible pigment was dispersed was obtained.

Preparation of Magenta Dispersion Liquid

A magenta dispersion liquid was prepared in the same manner as in the preparation of the cyan dispersion liquid except that a magenta pigment (Pigment Red 122 (trade name) manufactured by BASF Japan Ltd)) was used in place of the cyan pigment.

Preparation of Yellow Dispersion Liquid

A yellow dispersion liquid was prepared in the same manner as in the preparation of the cyan dispersion liquid except that a yellow pigment (Pigment Yellow 74 (trade name) manufactured by BASF Japan Ltd)) was used in place of the cyan pigment.

Synthesis of Self-Dispersing Polymer Particles B-1

360.0 g of methyl ethyl ketone was introduced in a 2 L three-necked flask equipped with a stirrer, a thermometer, a reflux condenser, and a nitrogen gas introduction tube, and was heated to 75° C. Thereafter, while the temperature inside the flask was maintained at 75° C., a mixture solution of 180.0 g of phenoxyethyl acrylate, 162.0 g of methyl methacrylate, 18.0 g of acrylic acid, 72 g of methyl ethyl ketone, and 1.44 g of "V-601" (trade name, manufactured by Wako Pure Chemical Industries Ltd.) was added dropwise into the flask at a constant rate such that the dropwise addition was completed in 2 hours. After the dropwise addition was completed, a solution of 0.72 g of "V-601 (trade name)" and 36.0 g of methyl ethyl ketone was added into the flask, stirred at 75° C. for 2 hours, and a solution of 0.72 g of V-601 and 36.0 g of isopropanol was further added, and the contents of the flask were stirred at 75° C. for 2 hours. Then, the temperature inside the flask was increased to 85° C., and stirring was continued for another 2 hours. As a result, a resin solution of a copolymer of phenoxyethyl acrylate/methyl methacrylate/acrylic acid (=50/45/5 [mass ratio]) was obtained.

The weight average molecular weight (Mw) of the obtained copolymer measured in the same manner as described above was 64,000 (calculated by gel permeation chromatography (GPC) in terms of polystyrene). The acid value of the copolymer was found to be 38.9 mgKOH/g.

Then, 668.3 g of the resin solution thus obtained were weighed, 388.3 g of isopropanol and 145.7 ml of a 1 mol/L NaOH aqueous solution were added thereto, and the temperature inside the reaction vessel was raised to 80° C. Thereafter, 720.1 g of distilled water was added dropwise into the reaction vessel at a rate of 20 ml/min to form a water dispersion. The contents of the reaction vessel were allowed to stand, under atmospheric pressure at a temperature inside the reaction vessel of 80° C. for 2 hours, and then at 85° C. for 2 hours, and then at 90° C. for 2 hours. Subsequently, the pressure inside the reaction vessel was reduced, and a total amount of 913.7 g of the isopropanol, the methyl ethyl ketone and the distilled water were removed by distillation. As a result, a water dispersion of a self-dispersing polymer fine particle B-1 having a solid concentration of 28.0% by mass was obtained.

Synthesis of Polymerizable Compound (1)

40.0 g (182 mmol) of 4,7,10-trioxa-1,13-tridecanediamine, 37.8 g (450 mmol) of sodium hydrogen carbonate, 100 g of water, and 300 g of tetrahydrofuran were added to a 1 L 3-neck flask equipped with a stirrer, and then, into the flask, 35.2 g (389 mmol) of acrylic acid chloride was added dropwise over 20 minutes in an ice bath. After the addition, stirring was performed at room temperature for 5 hours and then the tetrahydrofuran was removed from the obtained reaction mixture by distillation under reduced pressure. Then, a water layer was extracted with 200 ml of ethyl acetate four times, the resulting organic layer was dried with magnesium sulfate and filtered, and the solvent was removed by distillation under reduced pressure to obtain 35.0 g of a solid of a desired polymerizable compound (1) (107 mmol, yield 59%).

After the preparation of each of the cyan dispersion liquid, the magenta dispersion liquid and the yellow dispersion liquid, inks having the following composition were prepared by using the water dispersion of the self-dispersing polymer fine particle B-1, the polymerizable compound (1), a polymerization initiator, an organic solvent, a surfactant, and ion exchange water with the cyan dispersion liquid, the magenta dispersion liquid or the yellow dispersion liquid. After the preparation of ink, the resulting ink was subjected to centrifugal separation using a high-speed refrigerated centrifuge 7780 (trade name: manufactured by KUBOTA Corporation) (centrifugal separation performed at 2000 G to 15000 G for 5 minutes to 2 hours, as necessary until the desired number of coarse particles was obtained), and further was filtered with a glass filter (GS-25: trade name, manufactured by Advantec Toyo Kaisha, Ltd.) and then filtered with a filter (PVDF film, pore diameter of 5 µm, manufactured by Millipore Corporation), as necessary, to prepare an ink liquid. An ink composition having the volume average particle diameter and the number of particles having a diameter of 0.8 µm or more according to Table 1 was prepared.

The volume average particle diameter of particles contained in the ink thus obtained (secondary particle) was measured by a dynamic light scattering method using a NANOTRAC particle size distribution measuring instrument (trade name: UPA-EX150, manufactured by NIKKISO CO., LTD.).

The number of particles having a diameter of 0.8 µm or more in the ink was determined by measuring the number of coarse particles having a diameter of 0.8 µm to 5 µm in the ink composition using a flow-type particle shape analyzer FPIA3000 (trade name, manufactured by Sysmex Corporation). At this time, the measurement was carried out at 25° C.

using a sample for measurement prepared by adding 1.8 ml of ion exchange water to 0.2 ml of the ink composition. The number of coarse particles in 1 μl of ink was calculated from the obtained results.

Composition of Cyan Inks 1 to 7 and 10

| | |
|---|---|
| Cyan dispersion liquid | 40% by mass |
| Water dispersion of self-dispersing polymer fine particle B-1 | 2% by mass |
| Polymerizable compound (1) (nonionic polymerizable monomer) | 19% by mass |
| SANNIX GP250 (trade name, manufactured by Sanyo Chemical Industries, Ltd.; hydrophilic organic solvent) | 1.5% by mass |
| OLFINE E1010 (trade name, manufactured by Nissin Chemical Industry Co., Ltd.) | 1% by mass |
| IRGACURE 2959 (trade name, manufactured by BASF Japan Ltd.; photopolymerization initiator) | 2.9% by mass |
| Ion exchange water | remainining amount (added such that the total amount of the composition was 100%) |

Polymerizable compound (1)

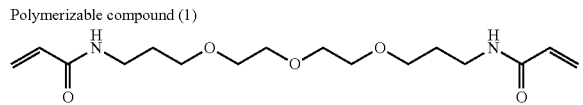

Composition of Magenta Inks 1 to 7 and 10

| | |
|---|---|
| Magenta dispersion liquid | 40% by mass |
| Water dispersion of self-dispersing polymer fine particle B-1 | 2% by mass |
| Polymerizable compound (1) (nonionic polymerizable monomer) | 19% by mass |
| SANNIX GP250 (trade name, manufactured by Sanyo Chemical Industries, Ltd.; hydrophilic organic solvent) | 1.5% by mass |
| OLFINE E1010 (trade name, manufactured by Nissin Chemical Industry Co., Ltd.) | 1% by mass |
| IRGACURE 2959 (trade name, manufactured by BASF Japan Ltd.; photopolymerization initiator) | 2.9% by mass |
| Ion exchange water | remaining amount (added such that the total amount of the composition was 100%) |

Composition of Yellow Inks 1 to 4

| | |
|---|---|
| Yellow dispersion liquid | 40% by mass |
| Water dispersion of self-dispersing polymer fine particle B-1 | 2% by mass |
| Polymerizable compound (1) (nonionic polymerizable monomer) | 19% by mass |
| SANNIX GP250 (trade name, manufactured by Sanyo Chemical Industries, Ltd.; hydrophilic organic solvent) | 1.5% by mass |
| OLFINE E1010 (trade name, manufactured by Nissin Chemical Industry Co., Ltd.) | 1% by mass |
| IRGACURE 2959 (trade name, manufactured by BASF Japan Ltd.; photopolymerization initiator) | 2.9% by mass |
| Ion exchange water | remainining amount (added such that the total amount of the composition was 100%) |

Composition of Cyan Ink 8

| | |
|---|---|
| Cyan dispersion liquid | 40% by mass |
| Water dispersion of self-dispersing polymer fine particle B-1 | 2% by mass |
| Polymerizable compound (1) (nonionic polymerizable monomer) | 8% by mass |
| SANNIX GP250 (trade name, manufactured by Sanyo Chemical Industries, Ltd.; hydrophilic organic solvent) | 1.5% by mass |
| OLFINE E1010 (trade name, manufactured by Nissin Chemical Industry Co., Ltd.) | 1% by mass |
| IRGACURE 2959 (trade name, manufactured by BASF Japan Ltd.; photopolymerization initiator) | 1.3% by mass |
| Ion exchange water | remaining amount (added such that the total amount of the composition was 100%) |

Composition of Magenta Ink 8

| | |
|---|---|
| Magenta dispersion liquid | 40% by mass |
| Water dispersion of self-dispersing polymer fine particle B-1 | 2% by mass |
| Polymerizable compound (1) (nonionic polymerizable monomer) | 8% by mass |
| SANNIX GP250 (trade name, manufactured by Sanyo Chemical Industries, Ltd.; hydrophilic organic solvent) | 1.5% by mass |
| OLFINE E1010 (trade name, manufactured by Nissin Chemical Industry Co., Ltd.) | 1% by mass |
| IRGACURE 2959 (trade name, manufactured by BASF Japan Ltd.; photopolymerization initiator) | 1.3% by mass |
| Ion exchange water | remaining amount (added such that the total amount of the composition was 100%) |

Composition of Cyan Ink 9

| | |
|---|---|
| Cyan dispersion liquid | 40% by mass |
| Water dispersion of self-dispersing polymer fine particle B-1 | 2% by mass |
| Polymerizable compound (1) (nonionic polymerizable monomer) | 12% by mass |
| SANNIX GP250 (trade name, manufactured by Sanyo Chemical Industries, Ltd.; hydrophilic organic solvent) | 1.5% by mass |
| OLFINE E1010 (trade name, manufactured by Nissin Chemical Industry Co., Ltd.) | 1% by mass |
| IRGACURE 2959 (trade name, manufactured by BASF Japan Ltd.; photopolymerization initiator) | 2% by mass |
| Ion exchange water | remaining amount (added such that the total amount of the composition was 100%) |

Composition of Magenta Ink 9

| | |
|---|---|
| Magenta dispersion liquid | 40% by mass |
| Water dispersion of self-dispersing polymer fine particle B-1 | 2% by mass |
| Polymerizable compound (1) (nonionic polymerizable monomer) | 12% by mass |

Composition of Cyan Ink 11

| | |
|---|---|
| Cyan dispersion liquid | 40% by mass |
| Water dispersion of self-dispersing polymer fine particle B-1 | 2% by mass |
| Polymerizable compound (1) (nonionic polymerizable monomer) | 25% by mass |
| SANNIX GP250 (trade name, manufactured by Sanyo Chemical Industries, Ltd.; hydrophilic organic solvent) | 1.5% by mass |
| OLFINE E1010 (trade name, manufactured by Nissin Chemical Industry Co., Ltd.) | 1% by mass |
| IRGACURE 2959 (trade name, manufactured by BASF Japan Ltd.; photopolymerization initiator) | 3.8% by mass |
| Ion exchange water | remaining amount (added such that the total amount of the composition was 100%) |

Composition of Magenta Ink 11

| | |
|---|---|
| Magenta dispersion liquid | 40% by mass |
| Water dispersion of self-dispersing polymer fine particle B-1 | 2% by mass |
| Polymerizable compound (1) (nonionic polymerizable monomer) | 25% by mass |
| SANNIX GP250 (trade name, manufactured by Sanyo Chemical Industries, Ltd.; hydrophilic organic solvent) | 1.5% by mass |
| OLFINE E1010 (trade name, manufactured by Nissin Chemical Industry Co., Ltd.) | 1% by mass |
| IRGACURE 2959 (trade name, manufactured by BASF Japan Ltd.; photopolymerization initiator) | 3.8% by mass |
| Ion exchange water | remaining amount (added such that the total amount of the composition was 100%) |

Composition of Cyan Ink 12

| | |
|---|---|
| Cyan dispersion liquid | 15% by mass |
| Water dispersion of self-dispersing polymer fine particle B-1 | 2% by mass |
| Polymerizable compound (1) (nonionic polymerizable monomer) | 19% by mass |
| SANNIX GP250 (trade name, manufactured by Sanyo Chemical Industries, Ltd.; hydrophilic organic solvent) | 1.5% by mass |
| OLFINE E1010 (trade name, manufactured by Nissin Chemical Industry Co., Ltd.) | 1% by mass |
| IRGACURE 2959 (trade name, manufactured by BASF Japan Ltd.; photopolymerization initiator) | 2.9% by mass |
| Ion exchange water | remaining amount (added such that the total amount of the composition was 100%) |

Composition of Magenta Ink 12

| | |
|---|---|
| Magenta dispersion liquid | 15% by mass |
| Water dispersion of self-dispersing polymer fine particle B-1 | 2% by mass |
| Polymerizable compound (1) (nonionic polymerizable monomer) | 19% by mass |
| SANNIX GP250 (trade name, manufactured by Sanyo Chemical Industries, Ltd.; hydrophilic organic solvent) | 1.5% by mass |
| OLFINE E1010 (trade name, manufactured by Nissin Chemical Industry Co., Ltd.) | 1% by mass |
| IRGACURE 2959 (trade name, manufactured by BASF Japan Ltd.; photopolymerization initiator) | 2.9% by mass |
| Ion exchange water | remaining amount (added such that the total amount of the composition was 100%) |

Composition of Cyan Ink 13

| | |
|---|---|
| Cyan dispersion liquid | 60% by mass |
| Water dispersion of self-dispersing polymer fine particle B-1 | 2% by mass |
| Polymerizable compound (1) (nonionic polymerizable monomer) | 19% by mass |
| SANNIX GP250 (trade name, manufactured by Sanyo Chemical Industries, Ltd.; hydrophilic organic solvent) | 1.5% by mass |
| OLFINE E1010 (trade name, manufactured by Nissin Chemical Industry Co., Ltd.) | 1% by mass |
| IRGACURE 2959 (trade name, manufactured by BASF Japan Ltd.; photopolymerization initiator) | 2.9% by mass |
| Ion exchange water | remaining amount (added such that the total amount of the composition was 100%) |

Composition of Magenta Ink 13

| | |
|---|---|
| Magenta dispersion liquid | 60% by mass |
| Water dispersion of self-dispersing polymer fine particle B-1 | 2% by mass |
| Polymerizable compound (1) (nonionic polymerizable monomer) | 19% by mass |
| SANNIX GP250 (trade name, manufactured by Sanyo Chemical Industries, Ltd.; hydrophilic organic solvent) | 1.5% by mass |
| OLFINE E1010 (trade name, manufactured by Nissin Chemical Industry Co., Ltd.) | 1% by mass |
| IRGACURE 2959 (trade name, manufactured by BASF Japan Ltd.; photopolymerization initiator) | 2.9% by mass |
| Ion exchange water | remaining amount (added such that the total amount of the composition was 100%) |

Composition of Cyan Inks 14 to 17

Cyan inks 14 to 17 were each prepared in the same manner as in the preparation of the cyan ink 3 described above except that the following polymerizable monomers were used respectively instead of the polymerizable compound (1).

Polymerizable compound (2)

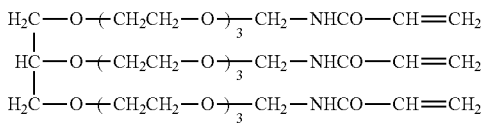

Polymerizable compound (3)

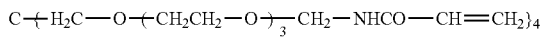

Polymerizable compound (4)

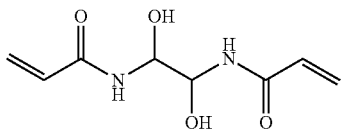

(Manufactured by TOKYO CHEMICAL INDUSTRY CO., LTD.)

Polymerizable compound (5)

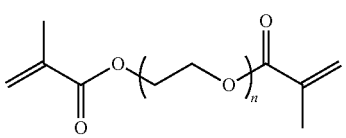

n = 9
A-400 (Trade name), Manufactured by SHIN-NAKAMURA CHEMICAL CO., LTD.

The polymerizable compound (2) and the polymerizable compound (3) were each synthesized in the same manner as in the synthesis of the polymerizable compound (1).

Composition of Magenta Inks 14 to 17

Magenta inks 14 to 17 were prepared in the same manner as in the preparation of the magenta ink 3 described above except that the following polymerizable monomers were used respectively instead of the polymerizable compound (1).

Preparation of Treatment Liquid

A treatment liquid was prepared in accordance with the following manner.

The treatment liquid was prepared by mixing respective components of the following composition. The viscosity, surface tension and pH (25° C.) of the treatment liquid measured were 2.5 mPa·s, 40 mN/m and pH 1.0, respectively.

Composition of Treatment Liquid

| | |
|---|---|
| Malonic acid (manufactured by Wako Pure Chemical Industries, Ltd.) | 25% by mass |
| Diethyleneglycolmonomethylether (manufactured by Wako Pure Chemical Industries, Ltd.) | 20.0% by mass |
| EMULGEN P109 (trade name, manufactured by Kao Corporation., nonionic surfactant) | 1.0% by mass |
| Ion exchange water | 54% by mass |

Image Recording and Evaluation

An image was recorded in the following manner using the inks and the aqueous treatment liquid thus obtained in accordance with a combination shown in the following Table 1. Image qualities and abrasion resistance of the recorded image were evaluated in accordance with the following method. The evaluation results are shown in Table 1 below.

Image Recording

First, as shown in FIG. 1, an inkjet device was prepared which has a treatment liquid applying unit 12 equipped with a treatment liquid jetting head 12S that jets a treatment liquid, a treatment liquid drying zone 13 that dries the applied treatment liquid, an ink jetting unit 14 that jets various aqueous inks, an ink drying zone 15 that dries the jetted aqueous ink compositions, and a UV irradiation unit 16 equipped with a UV irradiation lamp 16S capable of irradiating ultraviolet rays (UV) are provided in this order in the conveyance direction of a recording medium (the direction of the arrow shown in the FIGURE).

Although not shown in the FIGURE, the treatment liquid drying zone 13 has an air blower that performs drying by supplying dry air at a recording surface side of the recording medium, and has an infrared ray heater at a non-recording surface of the recording medium. The treatment liquid drying zone 13 is configured such that at least 70% by mass of the water contained in the aqueous treatment liquid can be evaporated (dried) off within 900 msec after the application of the treatment liquid is started at the treatment liquid application unit by regulating the temperature and air volume. Further, in the ink jetting unit 14, a black-ink jetting head 30K, a cyan-ink jetting head 30C, a magenta-ink jetting head 30M, and a yellow-ink jetting head 30Y are disposed in this order in the conveyance direction (the direction of the arrow). Each of the heads is a 1200 dpi/10 inch-wide full-line head (a driving frequency: 25 kHz and a recording medium conveyance velocity of 530 mm/sec). The respective heads jet inks of respective colors in a single-pass manner while moving in the main scanning direction relative to the recording medium, thereby recording an image.

The treatment liquid and the inks obtained above were charged to storage tanks (not shown) respectively connected to the treatment liquid jetting head 12S and ink jetting heads 30C, 30M and 30Y for respective colors of the inkjet device that was configured as shown in FIG. 1. A solid image and a 1200 dpi line image were recorded on sheets of a recording medium. The amount of aqueous treatment liquid applied to each sheet of the recording medium was set to be 5 ml/m². The recording medium used herein was "U-RITE" (trade name, manufactured by Nippon Paper Group, Inc., basis weight of 84.9 g/m²).

The treatment liquid 1 and the ink compositions C1 to C5 each prepared above were charged into each of storage tanks (not shown in the FIGURE) respectively connected to the treatment jetting head 12S and the cyan ink jetting head 30C of the inkjet device shown in FIG. 1. A solid image and a 1200 dpi line image were recorded on a recording medium. The amount of the treatment liquid applied to the recording medium was set to be 5 ml/m². As the recording medium, "OK TOPKOTE (trade name)" (having a basis weight of 104.7 g/m²) manufactured by Oji Paper Co., Ltd. was used.

During the image recording, the treatment liquid and the cyan ink were each jetted at a resolution of 1200 dpi×600 dpi, an ink amount per droplet of 3.5 pl, and a maximum application amount of ink of 11 ml/m². The line image was recorded by jetting so as to form a line having a width of 1 dot at 1200 dpi in a single-pass manner in the main scanning direction. Regarding the solid image, a solid image was formed by jetting the ink onto the entire one surface of a sample which was prepared by cutting the recording medium into an A5 size to obtain the solid image.

When the image was recorded, the treatment liquid was first jetted from treatment liquid jetting head 12S onto the recording medium in a single-pass manner, and then the treatment liquid was dried in treatment liquid drying zone 13 such that the recording medium passed the treatment liquid drying zone within 900 msec after the initiation of the jetting of the aqueous treatment liquid. In treatment liquid drying zone 13, while the jetted aqueous treatment liquid was heated with an infrared ray heater from a side of the recording medium opposite to the surface onto which the treatment liquid was jetted (rear face) such that the surface temperature of the jetted treatment liquid was maintained at from 40° C. to 45° C., hot air of 120° C. is supplied using an air blower at a control of air flow amount such that the predetermined drying amount was obtained. Subsequently, after the cyan ink (first ink composition: Example Nos. 101 to 107, 301 to 306, and 501 to 504) was jetted from the cyan ink jetting head 30C in a single pass manner to record an image, the magenta ink (second ink composition: Example Nos. 101 to 107, 301 to 306, and 501 to 504) was jetted from the magenta ink jetting head 30M in a single pass manner to record an image. Regarding Example Nos. 201 to 204, after the magenta ink (first ink composition) was jetted from the magenta ink jetting head 30M in a single pass manner to record an image, the yellow ink (second ink composition) was jetted from the yellow ink jetting head 30Y in a single pass manner to record an image. Regarding Examples Nos. 601 to 604, the cyan ink was jetted from the cyan ink jetting head 30C in a single pass manner to record an image. Then, in a manner similar to the above, drying of the ink was performed in ink drying zone 15 using an air blower by blowing hot air having a temperature of 120° C. at 5 m/sec for 15 seconds while heating the jetted ink with an infrared ray heater from the side of the recording medium opposite to the surface on which the ink was jetted (rear face). After the drying of the image, the image was cured by irradiation with UV rays (a metal halide lamp manufactured by Eye Graphics Co., Ltd., a maximum irradiation wavelength of 365 nm) in the UV irradiation unit 16 so as to have an accumulated irradiation amount of 3 J/cm$^2$.

Image Evaluation

1. Image Qualities (Image Printing Properties)

Based on the lines having thickness of 1 dot, 2 dots and 4 dots, respectively, which were recorded on a sheet of U-RITE as described above, image printing properties were evaluated in accordance with the following evaluation criteria. The evaluation results are shown in Tables 1 to 3 below.

Evaluation Criteria

1: Each of the three lines was uniform.

2: Although the line having a thickness of 1 dot was uniform, at least one of non-uniformity of line thickness, line breaking, or excessive ink deposition was observed at a part of the lines having thickness of 2 dots and 4 dots.

3: Although the line having a thickness of 1 dot was uniform, at least one of non-uniformity of line thickness, line breaking, or excessive ink deposition was observed over the entire lengths of the lines having thickness of 2 dots and of 4 dots.

4: At least one of non-uniformity of line thickness, line breaking, or excessive ink deposition was clearly observed over the entire length of each of the three lines.

2. Abrasion Resistance

A sheet of U-RITE that has not undergone recording (hereinafter, referred to as "unused sample" in this test) was placed over the surface of the A5-sized sample on which the solid image was formed on the entire one surface, and rubbed thereagainst 10 strokes with a load of 200 kg/m$^2$. Thereafter, the unused sample and the solid image were observed with the naked eye, and evaluated in accordance with the following evaluation criteria. The test was carried out under the environment of a room temperature of 23° C. and a humidity of 50%. The evaluation results are shown in the following Tables 1 to 3.

Evaluation Criteria

1: The color did not transfer onto the unused sample, and deterioration in the rubbed solid image was not observed, either.

2: Although the color transferred to the unused sample, deterioration in the rubbed solid image was not observed.

3: The color transferred to the unused sample, and deterioration in the rubbed solid image was observed.

4: A part of the rubbed solid image was erased and the base paper of U-RITE was exposed.

As can be seen from Tables 1 to 3, in Examples, images were obtained which had excellent abrasion resistance, showed excellent image printing properties including high reproducibility of thin lines or minutes portions in the images even when recording was performed at a high speed. On the contrary, Comparative Examples were inferior in abrasion resistance of images as well as in image printing properties.

TABLE 1

| | First ink composition | | | Second ink composition | | | Pigment concentration 1 | Pigment concentration 2 | Monomer concentration 1 | Monomer concentration 2 | Abrasion resistance | Image qualities | |
|---|---|---|---|---|---|---|---|---|---|---|---|---|---|
| Example No. | Pigment ink 1 | Volume average particle diameter (nm) | The number of particles with a diameter of 0.8 μm or more (particles/μl) | Pigment ink 2 | Volume average particle diameter (nm) | The number of particles with a diameter of 0.8 μm or more (particles/μl) | | | | | | | |
| 101 | Cyan ink 1 | 98 | 18,500 | Magenta ink 1 | 92 | 12,000 | 4 | 4 | 18 | 18 | 2 | 2 | The present invention |
| 102 | Cyan ink 2 | 91 | 8,500 | Magenta ink 2 | 91 | 5,000 | 4 | 4 | 18 | 18 | 2 | 1 | The present invention |
| 103 | Cyan ink 3 | 90 | 2,500 | Magenta ink 3 | 88 | 1,100 | 4 | 4 | 18 | 18 | 1 | 1 | The present invention |
| 104 | Cyan ink 4 | 89 | 800 | Magenta ink 4 | 87 | 3,900 | 4 | 4 | 18 | 18 | 2 | 1 | The present invention |
| 105 | Cyan ink 5 | 91 | 11,000 | Magenta ink 5 | 93 | 18,900 | 4 | 4 | 18 | 18 | 3 | 2 | The present invention |
| 106 | Cyan ink 6 | 95 | 48,000 | Magenta ink 6 | 97 | 35,000 | 4 | 4 | 18 | 18 | 3 | 3 | Comparative Example |
| 107 | Cyan ink 7 | 190 | 160,000 | Magenta ink 7 | 205 | 130,000 | 4 | 4 | 18 | 18 | 4 | 4 | Comparative Example |
| 201 | Magenta ink 1 | 92 | 12,000 | Yellow ink 1 | 82 | 11,000 | 4 | 4 | 18 | 18 | 2 | 2 | The present invention |
| 202 | Magenta ink 2 | 91 | 5,000 | Yellow ink 2 | 78 | 4,500 | 4 | 4 | 18 | 18 | 2 | 1 | The present invention |

TABLE 1-continued

| | First ink composition | | | Second ink composition | | | Pigment concentration 1 | Pigment concentration 2 | Monomer concentration 1 | Monomer concentration 2 | Abrasion resistance | Image qualities | |
|---|---|---|---|---|---|---|---|---|---|---|---|---|---|
| Example No. | Pigment ink 1 | Volume average particle diameter (nm) | The number of particles with a diameter of 0.8 μm or more (particles/μl) | Pigment ink 2 | Volume average particle diameter (nm) | The number of particles with a diameter of 0.8 μm or more (particles/μl) | | | | | | | |
| 203 | Magenta ink 6 | 97 | 35,000 | Yellow ink 3 | 95 | 42,000 | 4 | 4 | 18 | 18 | 3 | 3 | Comparative Example |
| 204 | Magenta ink 7 | 205 | 130,000 | Yellow ink 4 | 250 | 130,000 | 4 | 4 | 18 | 18 | 4 | 4 | Comparative Example |
| 301 | Cyan ink 8 | 90 | 3,000 | Magenta ink 8 | 87 | 1,200 | 4 | 4 | 8 | 8 | 2 | 2 | The present invention |
| 302 | Cyan ink 9 | 90 | 3,300 | Magenta ink 9 | 87 | 1,300 | 4 | 4 | 12 | 12 | 1 | 1 | The present invention |
| 303 | Cyan ink 10 | 90 | 2,500 | Magenta ink 10 | 87 | 1,200 | 4 | 4 | 18 | 18 | 1 | 1 | The present invention |
| 304 | Cyan ink 11 | 90 | 3,400 | Magenta ink 11 | 87 | 1,400 | 4 | 4 | 25 | 25 | 2 | 2 | The present invention |
| 305 | Cyan ink 12 | 90 | 2,900 | Magenta ink 12 | 87 | 900 | 1.5 | 1.5 | 18 | 18 | 2 | 2 | The present invention |
| 306 | Cyan ink 13 | 90 | 3,800 | Magenta ink 13 | 87 | 1,300 | 6 | 6 | 18 | 18 | 2 | 2 | The present invention |

TABLE 2

| | First ink composition | | | Second ink composition | | | | | | |
|---|---|---|---|---|---|---|---|---|---|---|
| Example No. | Pigment ink 1 | Volume average particle diameter (nm) | The number of particles with a diameter of 0.8 μm or more (particles/μl) | Pigment ink 2 | Volume average particle diameter (nm) | The number of particles with a diameter of 0.8 μm or more (particles/μl) | Polymerizable monomer | Abrasion resistance | Image qualities | |
| 501 | Cyan ink 14 | 90 | 3,100 | Magenta ink 14 | 88 | 2,300 | Polymerizable compound (2) | 1 | 1 | The present invention |
| 502 | Cyan ink 15 | 90 | 2,100 | Magenta ink 15 | 88 | 800 | Polymerizable compound (3) | 1 | 1 | The present invention |
| 503 | Cyan ink 16 | 90 | 2,800 | Magenta ink 16 | 88 | 1,300 | Polymerizable compound (4) | 1 | 1 | The present invention |
| 504 | Cyan ink 17 | 90 | 3,000 | Magenta ink 17 | 88 | 1,000 | Polymerizable compound (5) | 1 | 1 | The present invention |

TABLE 3

| | First ink composition | | | | | | | |
|---|---|---|---|---|---|---|---|---|
| Example No. | Pigment ink 1 | Volume average particle diameter (nm) | The number of particles with a diameter of 0.8 μm or more (particles/μl) | Pigment Concentration 1 | Monomer Concentration 1 | Abrasion resistance | Image qualities | |
| 601 | Cyan ink 1 | 98 | 18,500 | 4 | 18 | 1 | 2 | The present invention |
| 602 | Cyan ink 2 | 91 | 8,500 | 4 | 18 | 1 | 1 | The present invention |
| 603 | Cyan ink 6 | 95 | 48,000 | 4 | 18 | 3 | 3 | Comparative Example |
| 604 | Cyan ink 7 | 190 | 160,000 | 4 | 18 | 4 | 4 | Comparative Example |

According to the present invention, an ink composition is provided which exhibits superior abrasion resistance and favorable image printing properties when recording is performed at a high speed.

Embodiments of the present invention include, but are not limited to, the following.

<1> An ink composition comprising: a pigment; water; a polymerizable monomer that is capable of being polymerized by an active energy ray; and an initiator that is capable of initiating polymerization of the polymerizable monomer by the active energy ray, wherein a number of particles contained in the ink composition having a particle diameter of 0.8 μm or more is 20,000 particles/μl or less.

<2> The ink composition according to <1>, wherein the number of particles contained in the ink composition having a particle diameter of 0.8 μm or more is 10,000 particles/μl or less.

<3> The ink composition according to <1> or <2>, wherein the number of particles contained in the ink composition having a particle diameter of 0.8 μm or more is 4,000 particles/μl or less.

<4> The ink composition according to any one of <1> to <3>, wherein the pigment comprises a water-dispersible pigment, a surface of which is at least partially coated with a polymer dispersant.

<5> The ink composition according to <4>, wherein the polymer dispersant has a carboxyl group.

<6> The ink composition according to any one of <1> to <5>, wherein the polymerizable monomer comprises a nonionic compound.

<7> The ink composition according to any one of <1> to <6>, further comprising a polymer particle.

<8> The ink composition according to any one of <1> to <7>, wherein a concentration of the pigment is from 1.8% by mass to 5.5% by mass and a concentration of the polymerizable monomer that is capable of being polymerized by an active energy ray is from 10% by mass to 22% by mass, with respect to a total mass of the ink composition.

<9> An ink set comprising at least a cyan ink, a magenta ink, a yellow ink and a black ink, wherein each of the cyan ink, the magenta ink, the yellow ink and the black ink comprises the ink composition according to any one of <1> to <8>.

<10> An ink set comprising the ink composition according to any one of <1> to <8> and a treatment liquid containing an aggregating agent that is capable of aggregating components of the ink composition.

<11> The ink set according to <10>, wherein the aggregating agent comprises an organic acid.

<12> An inkjet recording method comprising applying the ink composition according to any one of <1> to <8> to a recording medium by inkjetting.

<13> The inkjet recording method according to <12>, wherein:

the applying of the ink composition is carried out by applying a first ink composition to a recording medium by inkjetting and then applying a second ink composition to the recording medium by inkjetting;

each of the first ink composition and the second ink composition comprises the ink composition according to any one of <1> to <8>; and a number of particles contained in the second ink composition having a particle diameter of 0.8 μm or more is smaller than a number of particles contained in the first ink composition having a particle diameter of 0.8 μm or more.

<14> The inkjet recording method according to <12> or <13> further comprising:

applying, to the recording medium, a treatment liquid containing an aggregating agent that is capable of aggregating components in the ink composition.

<15> The inkjet recording method according to any one of <12> or <14>, wherein the recording medium is a coated paper having a base paper and a coating layer containing an inorganic pigment.

All publications, patent applications, and technical standards mentioned in this specification are herein incorporated by reference to the same extent as if each individual publication, patent application, or technical standard was specifically and individually indicated to be incorporated by reference.

What is claimed is:

1. An inkjet recording method comprising applying a first ink composition to a recording medium by inkjetting and then applying a second ink composition to the recording medium by inkjetting, each of the first and second ink compositions comprising:

a pigment;

water;

a polymerizable monomer that is capable of being polymerized by an active energy ray; and an initiator that is capable of initiating polymerization of the polymerizable monomer by the active energy ray, wherein, in each of the first and second ink compositions, a number of particles having a particle diameter of 0.8 μm or more is from 250 particles/μl to 20,000 particles/μl, and a number of particles contained in the second ink composition having a particle diameter of 0.8 μm or more is smaller than a number of particles contained in the first ink composition having a particle diameter of 0.8 μm or more, and wherein the pigment comprises a water-dispersible pigment, a surface of which is at least partially coated with a polymer dispersant, and a volume average diameter of the pigment is from 78 nm to 150 nm.

2. The inkjet recording method according to claim 1, wherein, in each of the first and second ink compositions, the number of particles having a particle diameter of 0.8 μm or more is from 250 particles/μl to 10,000 particles/μl.

3. The inkjet recording method according to claim 1, wherein, in each of the first and second ink compositions, the number of particles having a particle diameter of 0.8 μm or more is from 250 particles/μl to 4,000 particles/μl.

4. The inkjet recording method according to claim 1, wherein the polymer dispersant has a carboxyl group.

5. The inkjet recording method according to claim 1, wherein the polymerizable monomer comprises a nonionic compound.

6. The inkjet recording method according to claim 1, further comprising a polymer particle.

7. The inkjet recording method according to claim 1, wherein, in each of the first and second ink compositions, a concentration of the pigment is from 1.8% by mass to 5.5% by mass and a concentration of the polymerizable monomer that is capable of being polymerized by an active energy ray is from 10% by mass to 22% by mass, with respect to a total mass of the ink composition.

8. The inkjet recording method according to claim 1, further comprising:

applying, to the recording medium, a treatment liquid containing an aggregating agent that is capable of aggregating components in the ink composition.

9. The inkjet recording method according to claim 1, wherein the recording medium is a coated paper having a base paper and a coating layer containing an inorganic pigment.

* * * * *